(12) United States Patent
Tan

(10) Patent No.: US 12,128,730 B2
(45) Date of Patent: Oct. 29, 2024

(54) THERMAL MANAGEMENT SYSTEM

(71) Applicant: HANGZHOU SANHUA RESEARCH INSTITUTE CO., LTD., Hangzhou (CN)

(72) Inventor: Yongxiang Tan, Hangzhou (CN)

(73) Assignee: HANGZHOU SANHUA RESEARCH INSTITUTE CO., LTD., Hangzhou (CN)

(*) Notice: Subject to any disclaimer, the term of this patent is extended or adjusted under 35 U.S.C. 154(b) by 366 days.

(21) Appl. No.: 17/603,942

(22) PCT Filed: Sep. 18, 2020

(86) PCT No.: PCT/CN2020/116032
§ 371 (c)(1),
(2) Date: Oct. 14, 2021

(87) PCT Pub. No.: WO2021/052445
PCT Pub. Date: Mar. 25, 2021

(65) Prior Publication Data
US 2022/0212518 A1    Jul. 7, 2022

(30) Foreign Application Priority Data

Sep. 19, 2019  (CN) .......................... 201910886904.1
Nov. 14, 2019  (CN) .......................... 201911110153.0
Nov. 14, 2019  (CN) .......................... 201911110168.7

(51) Int. Cl.
*B60H 1/00* (2006.01)
*B60L 58/26* (2019.01)
*B60L 58/27* (2019.01)

(52) U.S. Cl.
CPC .......... *B60H 1/00278* (2013.01); *B60L 58/26* (2019.02); *B60H 2001/00307* (2013.01);
(Continued)

(58) Field of Classification Search
CPC ...... B60H 1/00885; B60H 2001/00928; B60H 2001/0037; F25B 2313/0232
See application file for complete search history.

(56) References Cited

U.S. PATENT DOCUMENTS 6,640,889 B1 * 11/2003 Harte .................. B60H 1/32284
                                                        62/238.7
2004/0060316 A1 * 4/2004 Ito ........................ F28D 1/0426
                                                        62/324.1
(Continued)

FOREIGN PATENT DOCUMENTS

CN        103373193 B      5/2016
CN        108749517 A      11/2018
(Continued)

*Primary Examiner* — David J Teitelbaum
(74) *Attorney, Agent, or Firm* — Cheng-Ju Chiang

(57) ABSTRACT

The present disclosure discloses a thermal management system. The thermal management system includes a refrigerant system and a coolant system. The thermal management system also includes a fourth heat exchanger. The fourth heat exchanger is disposed in the coolant system. The fourth heat exchanger can absorb heat from the air and release heat to the air, which is beneficial to improve the performance of the thermal management system.

9 Claims, 14 Drawing Sheets

(52) U.S. Cl.
    CPC ...... *B60H 1/00485* (2013.01); *B60H 1/00899* (2013.01); *B60L 58/27* (2019.02)

(56) References Cited

U.S. PATENT DOCUMENTS

2005/0133215 A1* 6/2005 Ziehr ...................... B60L 58/27
                                                    62/238.7
2006/0032623 A1* 2/2006 Tsubone .................. F28D 20/00
                                                    165/202

FOREIGN PATENT DOCUMENTS

EP       3012133  A2   4/2016
FR       3027557  A1   4/2016
WO    2018/161907  A1   9/2018

\* cited by examiner

THERMAL MANAGEMENT SYSTEM

CROSS-REFERENCE TO RELATED APPLICATIONS

This application is a 35 U.S.C. § 371 National Phase conversion of International (PCT) Patent Application No. PCT/CN2020/116032, filed on Sep. 18, 2020, which claims priorities of a Chinese Patent Application No. 201910886904.1, filed on Sep. 19, 2019 and titled "THERMAL MANAGEMENT SYSTEM", a Chinese Patent Application No. 201911110153.0, filed on Nov. 14, 2019 and titled "THERMAL MANAGEMENT SYSTEM", and a Chinese Patent Application No. 201911110168.7, filed on Nov. 14, 2019 and titled "THERMAL MANAGEMENT SYSTEM", the entire contents of which are incorporated herein by reference. The PCT International Patent Application was filed and published in Chinese.

TECHNICAL FIELD

The present disclosure relates to a technical field of thermal management, in particular to a thermal management system for vehicles.

BACKGROUND

A thermal management system includes an external heat exchanger. A refrigerant in the external heat exchanger can absorb or release heat to the environment air. The thermal management system can thermally manage heating components to ensure that the heating components work within a reasonable temperature range. How to control the temperature of the heating components and improve the performance of the thermal management system is a technical problem that needs to be solved.

SUMMARY

An object of the present disclosure is to provide a thermal management system, which is beneficial to improve the performance of the thermal management system.

A thermal management system includes a refrigerant system and a coolant system. A refrigerant of the refrigerant system and a coolant of the coolant system are isolated from each other without mixing. The refrigerant system includes a compressor, a first heat exchanger and a throttling element. An outlet of the compressor is capable of communicating with a refrigerant inlet of the first heat exchanger. The thermal management system further includes a dual-channel heat exchanger. The dual-channel heat exchanger defines a refrigerant flow channel and a coolant flow channel. The throttling element is capable of communicating with an inlet of the compressor through the refrigerant flow channel of the dual-channel heat exchanger.

The coolant system includes a second heat exchanger and/or a third heat exchanger, the coolant flow channel of the dual-channel heat exchanger, a pump and a fourth heat exchanger. The fourth heat exchanger is disposed outside an air-conditioning box of a vehicle.

In a heating mode of the thermal management system, the compressor is in communication with the throttling element through the first heat exchanger, the pump is turned on and the throttling element is opened, and the coolant flow channel of the dual-channel heat exchanger is in communication with the fourth heat exchanger and the pump.

In a first cooling mode of the thermal management system, the pump is turned on, and at least one of the second heat exchanger and the third heat exchanger is in communication with the pump and the fourth heat exchanger.

The present disclosure also discloses a thermal management system including a refrigerant system and a coolant system, a refrigerant of the refrigerant system and a coolant of the coolant system being isolated from each other without mixing, the refrigerant system including a compressor and a first throttling device, the thermal management system further including a first dual-channel heat exchanger, the first dual-channel heat exchanger including a refrigerant flow channel and a coolant flow channel, the first throttling device being capable of communicating with an inlet of the compressor through the refrigerant flow channel of the first dual-channel heat exchanger;

the coolant system including a pump, a first branch and a second branch, the first branch including a second heat exchanger, the second branch including a third heat exchanger, the coolant system further including at least one fourth heat exchanger, at least one of the first branch and the second branch including the fourth heat exchanger, the fourth heat exchanger being disposed outside an air-conditioning box of a vehicle;

wherein in a heating mode of the thermal management system, the compressor, the pump is turned on and the first throttling device is opened, and the coolant flow channel of the first dual-channel heat exchanger, the pump and the fourth heat exchanger are in communication; and wherein in a first cooling mode of the thermal management system, the pump is turned on; the fourth heat exchanger and the pump are in communication with the second heat exchanger, and/or, the fourth heat exchanger, the pump and the third heat exchanger are in communication.

The thermal management system includes the refrigerant system and the coolant system. The fourth heat exchanger is a part of the coolant system. The fourth heat exchanger is disposed outside the air-conditioning box of the vehicle. The thermal management system can absorb heat in the air through the fourth heat exchanger, and the coolant system can release heat to the air through the fourth heat exchanger. By disposing a fourth heat exchanger in the coolant system, it provides a new way for the thermal management system to absorb and release heat. In other words, when the thermal management system is working, the fourth heat exchanger in the coolant system can not only absorb heat from the environment in the heating mode, but also release heat to the environment in the cooling mode, which is beneficial to enhance the heating and cooling performance of the thermal management system.

DETAILED DESCRIPTION

In the following, specific thermal management systems for vehicles are taken as an example for description in conjunction with the accompanying drawings. In the case of no conflict, the features in these embodiments can be combined with each other. When the description refers to the drawings, unless otherwise specified, the same numbers in different drawings indicate the same or similar elements.

First Embodiment

Figure 1:
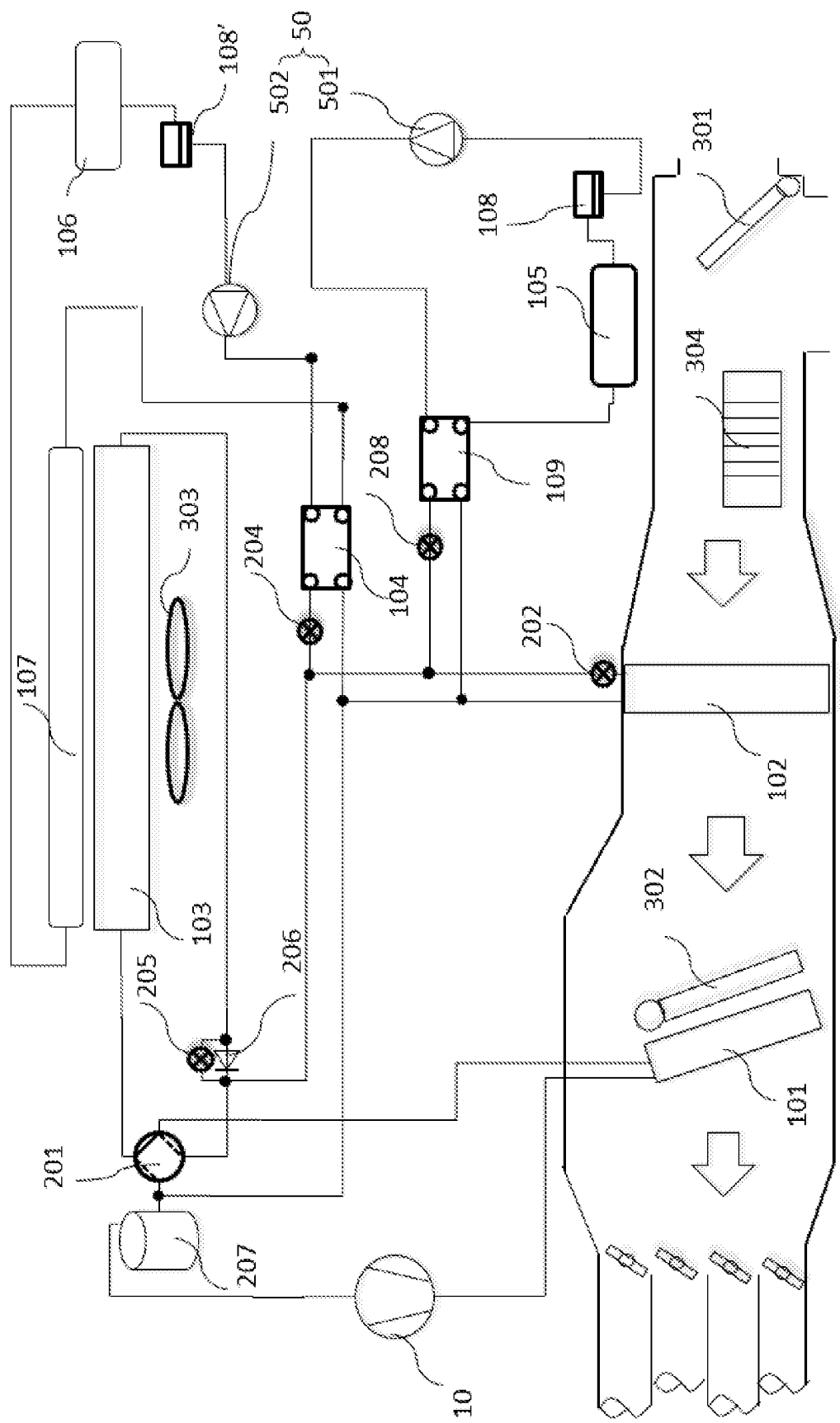
FIG. 1 is a schematic view of connection of a first embodiment of a thermal management system.

Referring to FIG. 1, a thermal management system includes a refrigerant system and a coolant system. A refrigerant of the refrigerant system and a coolant of the coolant system are isolated from each other without contacting each other. The refrigerant system includes a compressor 10, a first heat exchanger 101 and a throttling element. In an embodiment of the present disclosure, the throttling element includes a first throttling device 204 and a second throttling device 208. An outlet of the compressor 10 is in communication with a refrigerant inlet of the first heat exchanger 101. The thermal management system also includes a first dual-channel heat exchanger 104. The first dual-channel heat exchanger 104 has a refrigerant flow channel and a coolant flow channel. The refrigerant flowing through the refrigerant flow channel and the coolant flowing through the coolant flow channel can exchange heat in the first dual-channel heat exchanger 104. An inlet of the refrigerant flow channel of the first dual-channel heat exchanger 104 is in communication with the first throttling device 204. An outlet of the refrigerant flow channel of the first dual-channel heat exchanger 104 is in communication with an inlet of the compressor 10 or is in communication with the inlet of the compressor 10 via a gas-liquid separator 207. The thermal management system also includes a second dual-channel heat exchanger 109. The second dual-channel heat exchanger 109 has a refrigerant flow channel and a coolant flow channel. The refrigerant flowing through the refrigerant flow channel and the coolant flowing through the coolant flow channel can exchange heat in the second dual-channel heat exchanger 109. An inlet of the refrigerant flow channel of the second dual-channel heat exchanger 109 is in communication with the second throttling device 208. An outlet of the refrigerant flow channel of the second dual-channel heat exchanger 109 is in communication with the inlet of the compressor 10 or is in communication with the inlet of the compressor 10 via the gas-liquid separator 207. The coolant system includes a first loop and a second loop. The first loop and the second loop can operate independently from each other. The first loop includes the coolant flow channel of the first dual-channel heat exchanger 104, a second heat exchanger 106 and a first pump 502. The coolant flow channel of the first dual-channel heat exchanger 104, the second heat exchanger 106 and the first pump 502 are in communication in series so as to form the first loop. The first pump 502 can drive the coolant to flow in the first loop. The second heat exchanger 106 can be used to adjust the temperature of heat-generating devices such as motors, inverters and controllers. The heat-generating device such as the motor can directly or indirectly exchange heat with the coolant in the second heat exchanger 106, thereby adjusting the temperature of the heat-generating device such as the motor. The second loop includes the coolant flow channel of the second dual-channel heat exchanger 109, a third heat exchanger 105 and a second pump 501. The coolant flow channel of the second dual-channel heat exchanger 109, the third heat exchanger 105 and the second pump 501 are in communication in series so as to form the second loop. The second pump 501 can drive the coolant to flow in the second loop. The third heat exchanger 105 can be used to adjust the temperature of a heat-generating device such as a battery. The heat-generating device such as the battery can directly or indirectly exchange heat with the coolant in the third heat exchanger 105, thereby adjusting the temperature of the heat-generating device such as the battery. Since the working temperature of heat-generating device such as the motor is higher than that of heat-generating device such as the battery, the coolant in the first loop is not in communication with the coolant in the second loop in order to prevent damage to the battery.

Specifically, the first loop includes a first branch. The first branch includes the second heat exchanger 106 and the first pump 502. The second heat exchanger 106 is in communication with the first pump 502. The first branch has two ports. The two ports of the first branch are an inlet of the coolant flowing into the first branch and an outlet of the coolant flowing out of the first branch. The two ports of the first branch can be openings of a device or openings of a pipeline. In some embodiments of the present disclosure, the first pump 502 and/or the second pump 501 are also referred to as a pump 50.

The second loop includes a second branch. The second branch includes the third heat exchanger 105 and the second pump 501. The second branch has two ports. The two ports of the second branch are an inlet of the coolant flowing into the second branch and an outlet of the coolant flowing out of the second branch. The two ports of the second branch can be openings of a device or openings of a pipeline. The two ports of the second branch are communicated with the two ports of the coolant flow channel of the second dual-channel heat exchanger 109, respectively.

The coolant system also includes a fourth heat exchanger 107. In a technical solution of the present disclosure, the fourth heat exchanger 107 is disposed in the first loop. In other words, the fourth heat exchanger 107 is a part of the first loop. The fourth heat exchanger 107 may be an air-cooled heat exchanger, such as a microchannel heat exchanger. The fourth heat exchanger 107, the first pump 502 and the second heat exchanger 106 are in communication in series. In the thermal management system for the vehicle, the fourth heat exchanger 107 is disposed outside an air-conditioning box of a vehicle, and the fourth heat exchanger 107 can exchange heat with the environment air. Specifically, when the temperature of the heat-generating device such as the motor is high and needs to be dissipated, the coolant in the first loop only circulates in the first loop. The heat of heat-generating device such as the motor is released into the air through the fourth heat exchanger 107. At this time, it is not necessary to turn on the compressor 10 to realize the temperature control of the heat-generating device such as the motor, which can save energy. In other technical solutions of the present disclosure, the fourth heat exchanger 107 can be disposed in the second loop, which will not be described in detail. Alternatively, the first loop and the second loop may also share the fourth heat exchanger 107. When the first loop needs to dissipate heat, the first loop is in communication with the fourth heat exchanger 107. When the second loop needs to dissipate heat, the second loop is in communication with the fourth heat exchanger 107. Of course, the coolant system may also include two fourth heat exchangers 107, one of which is disposed in the first loop, and the other of which is disposed in the second loop.

The refrigerant system includes a first throttling unit 205, a seventh heat exchanger 103 and a first valve device 201. The seventh heat exchanger 103 includes at least a first port and a second port. The first throttling unit 205 can be in communication with the second port of the seventh heat exchanger 103. The refrigerant inlet of the first heat exchanger 101 is in communication with the outlet of the compressor 10. The refrigerant outlet of the first heat exchanger 101 is in communication with the first valve device 201. The refrigerant outlet of the first heat exchanger 101 can be in communication with the first throttling unit 205 through the first valve device 201. The first heat exchanger 101 can also be communication with the first throttling device 204 and/or the second throttling device 208 through the first valve device 201. The first port of the seventh heat exchanger 103 can also be communication with the inlet of the compressor 10 through the first valve device 201, or be communication with the inlet of the compressor 10 through the first valve device 201 and the gas-liquid separator 207 which is communicated between the first valve device 201 and the compressor 10. The refrigerant system also includes an eighth heat exchanger 102 and a second throttling unit 202. The second throttling unit 202 can be in communication with an inlet of the eighth heat exchanger 102. An outlet of the eighth heat exchanger 102 is in communication with the inlet of the compressor 10 or is in communication with the inlet of the compressor 10 via the gas-liquid separator 207. The first valve device 201 includes a first communication port, a second communication port, a third communication port and a fourth communication port. Specifically, the first communication port is in communication with the refrigerant outlet of the first heat exchanger 101. The fourth communication port is in communication with the inlet of the compressor 10. The second communication port can be in communication with at least one of the first throttling unit 205, the first throttling device 204, the second throttling device 208 and the second throttling unit 202. The third communication port is in communication with the first port of the seventh heat exchanger 103. The first valve device 201 includes a first working state and a second working state. In the first working state of the first valve device 201, the first valve device 201 only opens the communication channel between the first communication port and the third communication port, and closes the communication channels of other communication ports. In the second working state of the first valve device 201, the first valve device 201 opens the communication channel between the first communication port and the second communication port, and opens the communication channel between the third communication port and the fourth communication port. Among them, the first heat exchanger 101 and the eighth heat exchanger 102 are disposed in the air-conditioning box of the vehicle, and are used to adjust the temperature of a passenger compartment of the vehicle. The seventh heat exchanger 103 and the fourth heat exchanger 107 are disposed outside the air-conditioning box of the vehicle, and can exchange heat with the environment air.

The second port of the seventh heat exchanger 103 is also provided with a one-way element 206 parallel to the first throttling unit 205. In other words, the second communication port can be in communication with the second port of the seventh heat exchanger 103 through the first throttling unit 205 and the one-way element 206 which are connected in parallel. Among which, the one-way element 206 is turned on when the refrigerant flows out of the second port of the seventh heat exchanger 103, and is turned off when the refrigerant flows toward the second port of the seventh heat exchanger 103. In other words, the inlet of the one-way element 206 is in communication with the second port of the seventh heat exchanger 103. In addition, the first throttling unit 205 can also use a throttling device with a cut-off function, so that the one-way element 206 can be eliminated. In addition, the connection or communication described in this specification can be direct connection or communication. For example, two components can also be assembled together, which eliminates the need of a connecting pipeline, and the system is more compact. The connection or communication may also be an indirect connection or communication, such as communication through a pipeline, or communication after passing through a certain component, which will not be illustrated one by one here. In the technical solution disclosed in the present disclosure, turning on the throttling device means that the opening degree of the throttling device is the largest, turning off the throttling device means that the opening degree of the throttling device is zero, and opening the throttling device refers to a state between turning on and turning off, or a throttling state of the throttling device. The second throttling device 208 and the first throttling device 204 may be throttling devices such as a thermal expansion valve, an electronic expansion valve, or a capillary tube that can regulate the refrigerant flowing therethrough. The one-way element 206 can be a shut-off valve with on-off control function, a flow regulating valve or a solenoid valve, or a one-way valve that flows in one direction and shuts off in the other direction. The one-way element or valve module can also be integrated with the heat exchanger to form an assembly with a more compact structure, such as an assembly formed by the integration of the second throttling unit 202 and the eighth heat exchanger 102.

The coolant system of the thermal management system further includes a coolant storage device 108. The medium in the coolant storage device 108 may be a coolant. The coolant flow channel of the second dual-channel heat exchanger 109, the coolant storage device 108, the second pump 501 and the third heat exchanger 105 are in communication in series. At this time, the coolant in the coolant storage device 108 participates in the flow of the coolant system in the second loop. In other embodiments, the coolant storage device 108 may also only be in communication with the second loop and participate in the flow of the coolant in the second loop. A coolant storage device 108' may also be provided in the first loop, which will not be described in detail.

The air-conditioning box of the vehicle is provided with several air ducts (not shown) to communicate with the passenger compartment of the vehicle. A grille (not shown) is provided in the air duct in order to adjust the size of the air duct. An inner circulation air opening, an outer circulation air opening, a circulation damper 301 for adjusting the size of the inner circulation air opening and the outer circulation air opening, and a motor for driving the circulation damper 301 are disposed on a side of the air-conditioning box where the air enters. The inner circulation air opening is communicated with the passenger compartment of the vehicle. The air in the passenger compartment of the vehicle enters the air-conditioning box through the inner circulation air opening and then re-enters the vehicle cabin through the air duct, forming an inner circulation. The outer circulation air opening is communicated with the outside of the passenger compartment of the vehicle. The air outside the vehicle enters the air-conditioning box through the outer circulation air opening, and enters the passenger compartment of the vehicle through the air duct. The circulation damper 301 is disposed between the inner circulation port and the outer circulation port. The controller can control the circulation damper 301 through the motor. When the circulation damper 301 is switched to the inner circulation port, the inner circulation port can be closed to form an outer circulation. When the circulation damper 301 is switched to the outer circulation port, the outer circulation port can be closed to form the inner circulation. By adjusting the position of the circulation damper 301, the sizes of the inner circulation air opening and the outer circulation air opening can be adjusted, thereby adjusting the ratio of the air outside the vehicle to the air inside the vehicle when the air enters the air-conditioning box. In addition, a fan 303 is also provided on one side of the seventh heat exchanger 103, which can accelerate the air speed flowing through the seventh heat exchanger 103.

The first heat exchanger 101 is disposed in the air-conditioning box. A blower 304 is provided at a position of the air-conditioning box close to the inner circulation air opening and the outer circulation air opening. A temperature damper 302 is also provided on an upwind side of the first heat exchanger 101. When the thermal management system further includes the eighth heat exchanger 102, the first heat exchanger 101 and the eighth heat exchanger 102 may be disposed in the air-conditioning box at a certain distance. In other words, the temperature damper 302 is disposed between the first heat exchanger 101 and the eighth heat exchanger 102. When the temperature damper 302 is opened, the air blown in from the inner circulation port or the outer circulation port exchanges heat with the first heat exchanger 101. When the temperature damper 302 is closed, the air blown in from the inner circulation port or the outer circulation port cannot flow through the first heat exchanger 101. The air flows through the passages on both sides of the temperature damper 302, and then enters the vehicle cabin through the air duct. The seventh heat exchanger 103 and the fourth heat exchanger 107 are disposed outside the air-conditioning box of the vehicle. Specifically, the seventh heat exchanger 103 and the fourth heat exchanger 107 are disposed at a front end module of the vehicle close to a front bumper.

The thermal management system includes a heating mode and a first cooling mode. The working conditions of the thermal management system under several modes are described below. Among them, the heating mode of the thermal management system includes a first heating mode and a second heating mode. When the environment temperature is too low, the heating performance of the first heat exchanger 101 is insufficient, or the heat absorbed by the seventh heat exchanger 103 by the thermal management system is insufficient to provide the required indoor heat, the thermal management system executes the first heating mode. In the first heating mode, the first valve device 201 is in the second working state, and the first throttling unit 205 and the first throttling device 204 are opened. The refrigerant of the thermal management system is compressed by the compressor 10 and becomes a high-temperature and high-pressure refrigerant. The temperature damper 302 is opened. The high-temperature and high-pressure refrigerant exchanges heat with the surrounding air in the first heat exchanger 101. The refrigerant in the first heat exchanger 101 releases heat to the surrounding air. The flow paths for the refrigerant outlet of the first heat exchanger 101 leading to the second port of the seventh heat exchanger 103, and leading to the refrigerant flow channels of the first dual-channel heat exchanger 104 and the second dual-channel heat exchanger 109 are turned on, and the flow path leading to the eighth heat exchanger 102 is closed. Correspondingly, the refrigerant enters the seventh heat exchanger 103 after being throttled by the first throttling unit 205. The low-temperature and low-pressure refrigerant exchanges heat with the surrounding air in the seventh heat exchanger 103 and absorbs the heat of the air. The refrigerant can return to the compressor 10 after flowing out of the seventh heat exchanger 103, the refrigerant enters the compressor 10, and is compressed again by the compressor 10 into a high-temperature and high-pressure refrigerant, which works in cycles in this way. The refrigerant flowing through the refrigerant flow channels of the first dual-channel heat exchanger 104 exchanges heat with the coolant of the coolant system, then the refrigerant enters the compressor 10 and is compressed by the compressor 10 again. The situation of the second dual-channel heat exchanger 109 is the same as the situation of the first dual-channel heat exchanger 104, which will not be described in detail. In this embodiment, both the first throttling device 204 and the second throttling device 208 are opened, and both the first dual-channel heat exchanger 104 and the second dual-channel heat exchanger 109 participate in the work. Of course, in other embodiments, only one of the first throttling device 204 and the second throttling device 208 may be opened. Since heat-generating device such as the motor does not require high temperature control accuracy, the first throttling device 204 may be a thermal expansion valve with a cut-off function, which can reduce the cost. The second throttling device 208 can be an electronic expansion valve, which can accurately control the temperature of device such as the battery.

Taking the refrigerant heat exchange between the first loop and the first dual-channel heat exchanger 104 as an example, the heat-generating device such as the motor exchanges heat with the second heat exchanger 106, the coolant in the second heat exchanger 106 absorbs heat from the heat-generating device such as the motor. The thermal management system obtains the heat absorbed by the second heat exchanger 106 from the heat-generating device such as the motor through the first dual-channel heat exchanger 104, and releases it to the air-conditioning box through the first heat exchanger 101. At this time, there are two heat sources for the thermal management system, which are the air outside the air-conditioning box of the vehicle and the heat-generating device such as the motor. When the fourth heat exchanger 107 is also provided in the first loop, the fourth heat exchanger 107 can absorb heat from the environment air. It should be noted here that the fourth heat exchanger 107 is disposed upstream of the second heat exchanger 106. The word "upstream" mentioned here means that the coolant firstly passes through the fourth heat exchanger 107 and then passes through the second heat exchanger 106. This setting is because the temperature of the environment air is lower than the temperature of the heat-generating device such as the motor, the coolant firstly absorbs the heat of the environment air in the fourth heat exchanger 107, the temperature of the coolant rises, then the second heat exchanger 106 absorbs the heat, and then the temperature of the coolant can be further increased. If the second heat exchanger 106 is disposed upstream of the fourth heat exchanger 107, after the coolant absorbs heat from the second heat exchanger 106, it cannot absorb the heat from the fourth heat exchanger 107. The thermal management system can absorb heat from the air through the fourth heat exchanger 107, which is equivalent to increasing the heat exchange area of the seventh heat exchanger 103. Because the specific heat capacity of the coolant is larger than that of the air, and the temperature change range is smaller, the superheat control of the first dual-channel heat exchanger 104 is relatively easier than the control of the seventh heat exchanger 103. In addition, the dual-channel heat exchanger has a small volume, a short flow channel, and better oil return.

In winter, the temperature outside the vehicle is low in some areas. When the outside temperature is lower than or close to zero and the humidity is high to reach the dew point temperature, the surface of the seventh heat exchanger 103 is easy to frost, freeze, or malfunction, which will affect the energy efficiency of the thermal management system and even lose the heating performance. The thermal management system executes the second heating mode, the first valve device 201 is in the second working state, and at least one of the first throttling device 204 and the second throttling device 208 is opened. The refrigerant flowing out of the first heat exchanger 101 enters the first throttling device 204 and/or the second throttling device 208, after passing through the first valve device 201. The second throttling unit 202 is turned off. The thermal management system absorbs heat from the air and the heat-generating device such as the motor through the first loop; and/or, the thermal management system absorbs heat from the air and the heat-generating device such as the battery through the second loop. Compared with the first heating mode, the refrigerant flowing through the first dual-channel heat exchanger 104 can absorb heat from the coolant in the first loop; or the refrigerant flowing through the second dual-channel heat exchanger 109 can absorb heat from the second loop. When the seventh heat exchanger 103 cannot effectively absorb heat, the heat of the device such as the battery or the device such as the motor is used to provide a certain amount of heat indoors, which is beneficial to improve comfort. Of course, when the environment temperature is relatively high, the thermal management system absorbs heat through the seventh heat exchanger 103, and then releases heat in the first heat exchanger 101, which will not be described in detail.

In the first cooling mode of the thermal management system, the compressor 10 is turned off. Taking the operation of the first loop as an example, when the temperature of the heat-generating device such as the motor is high and needs to be cooled, the first pump 502 is turned on to allow the coolant in the first loop to flow in the first loop. The heat of the heat-generating device such as the motor is released to the coolant, and finally released into the air through the fourth heat exchanger 107. At this time, the heat-generating device such as the motor can be cooled by the first dual-channel heat exchanger 104, or the heat-generating device such as the motor can be cooled by itself, or the heat can be dissipated by another fourth heat exchanger 107. In the first cooling mode, the first pump 502 is turned on, the fourth heat exchanger 107, the first pump 502 and the second heat exchanger 106 are in communication, and the first pump 502 drives the coolant to flow in the first loop. In the first cooling mode, at least one of the battery or the motor uses the fourth heat exchanger 107 to release heat. The compressor 10 may not be turned on or the compressor 10 may be operated with relatively low power consumption, which can reduce energy consumption and save energy. In summary, in the heating mode of the thermal management system, the thermal management system can absorb heat in the air through the fourth heat exchanger 107. In the first cooling mode of the thermal management system, the thermal management system can release heat to the air through the fourth heat exchanger 107. Compared with the heat management system with only the seventh heat exchanger 103, it is equivalent to increasing the heat exchange area of the seventh heat exchanger 103, which improves the heating performance and cooling performance of the heat management system.

Second Embodiment

Figure 2:
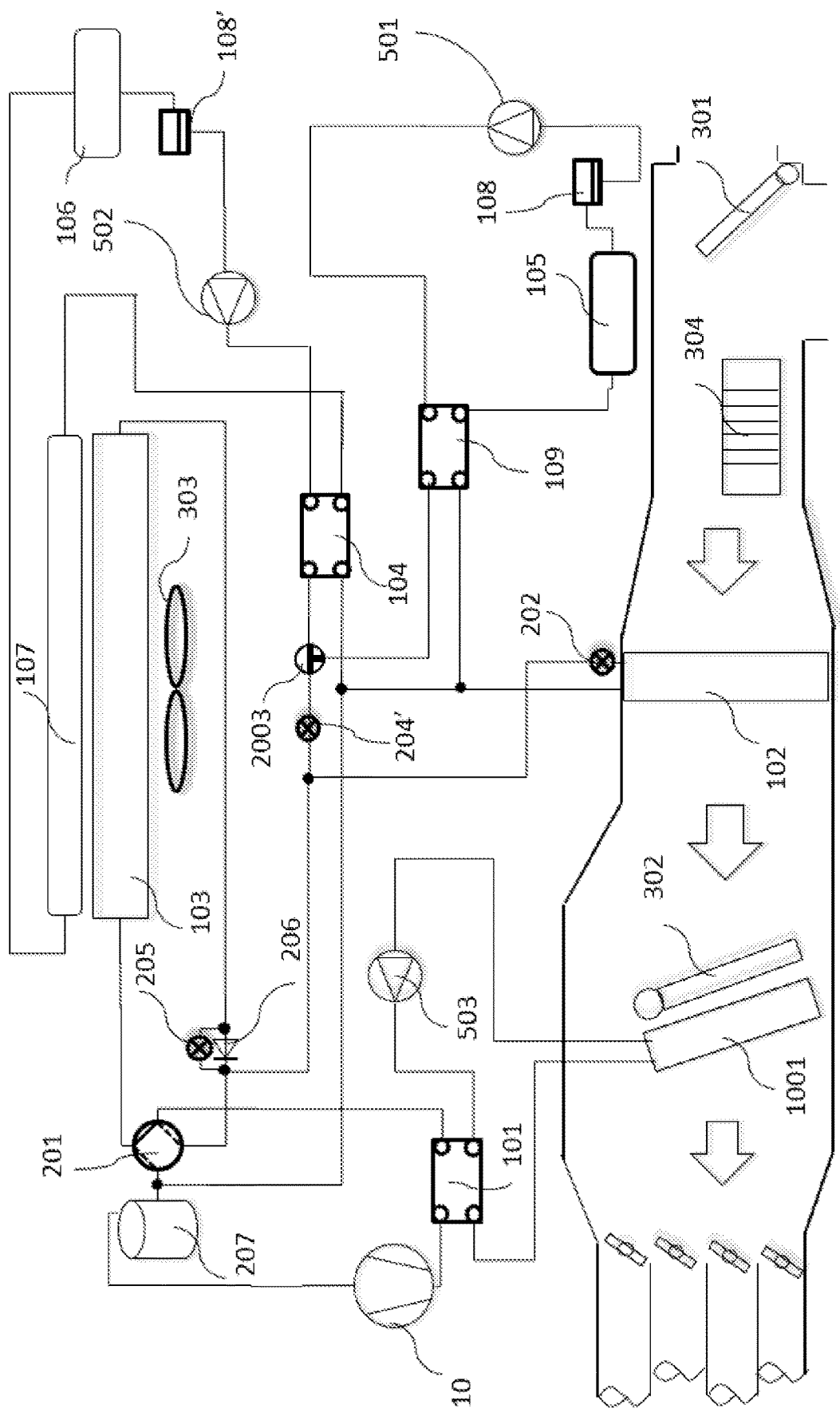
FIG. 2 is a schematic view of the connection of a second embodiment of the thermal management system.
Figure 3:
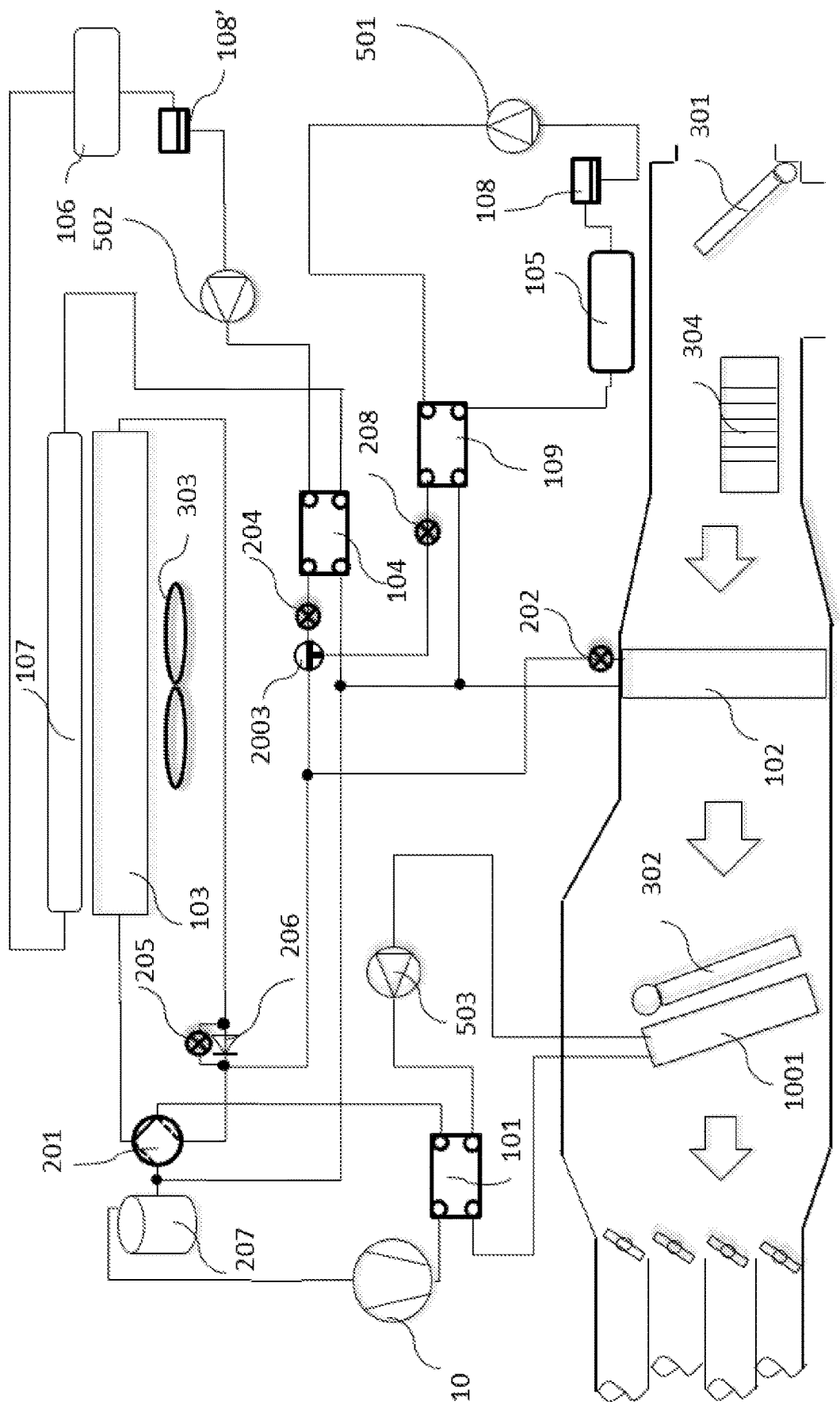
FIG. 3 is a schematic view of the connection of a third embodiment of the thermal management system.

Referring to FIG. 2, the refrigerant system can also be provided with only one throttling device 204', that is, only one of the first throttling device 204 and the second throttling device 208 in the first embodiment is provided. Specifically, the refrigerant system includes a first valve 2003. In this embodiment, the first valve 2003 is a three-way valve. The first valve 2003 has three connection ports. A first connection port of the first valve 2003 can be in communication with a second connection port of the first valve 2003 and/or a third connection port of the first valve 2003. The first valve 2003 may be a three-way switching valve or a three-way flow regulating valve. The first connection port of the first valve 2003 is in communication with a first port of the throttling device 204'. A second port of the throttling device 204' is in communication with the outlet of the one-way element 206. The second connection port of the first valve 2003 is in communication with the refrigerant inlet of the first dual-channel heat exchanger 104. The third connection port of the first valve 2003 is in communication with the inlet of the refrigerant flow channel of the second dual-channel heat exchanger 109. When the first connection port of the first valve 2003 is communicated with the third connection port of the first valve 2003, and the first connection port of the first valve 2003 is not communicated with the second connection port, the second pump 501 is turned on and the first pump 502 is turned off. At this time, the first dual-channel heat exchanger 104 does not work, and the refrigerant exchanges heat with the coolant of the second loop in the second dual-channel heat exchanger 109. When the first connection port of the first valve 2003 is not communicated with the third connection port, and the first connection port of the first valve 2003 is communicated with the second connection port, the second pump 501 is turned off and the first pump 502 is turned on. At this time, the refrigerant and the coolant of the first loop exchange heat in the first dual-channel heat exchanger 104, and the second dual-channel heat exchanger 109 does not work. In other embodiments, the first valve 2003 may also be a combination of two shut-off valves or flow regulating valves, which will not be described in detail. Compared with the embodiment shown in FIG. 1, the thermal management system can save an expansion valve and relatively reduce the cost. When the first throttling device 204 and the second throttling device 208 are thermal expansion valves or capillary tubes, in order to facilitate the control of the working conditions of the first dual-channel heat exchanger 104 and the second dual-channel heat exchanger 109, the refrigerant system is also provided with the first valve 2003. As shown in FIG. 3, the first connection port of the first valve 2003 is in communication with the outlet of the one-way element 206, the second connection port of the first valve 2003 is in communication with the refrigerant inlet of the first dual-channel heat exchanger 104 through the first throttling device 204, and the third connection port of the first valve 2003 is in communication with the refrigerant inlet of the second dual-channel heat exchanger 109 through the second throttling device 208. The specific working modes will not be described in detail.

Third Embodiment

Referring to FIG. 3, the first heat exchanger 101 is a dual-channel heat exchanger. For example, the first heat exchanger 101 may be a plate heat exchanger. The first heat exchanger 101 includes a refrigerant flow channel and a coolant flow channel. The outlet of the compressor 10 is in communication with an inlet of the refrigerant flow channel of the first heat exchanger 101. The high-temperature and high-pressure refrigerant can release heat in the refrigerant flow channel of the first heat exchanger 101 to increase the heat of the coolant in the coolant flow channel. The thermal management system includes a third loop. The third loop includes a third pump 503, the coolant flow channel of the first heat exchanger 101 and a sixth heat exchanger 1001. The third pump 503, the coolant flow channel of the first heat exchanger 101 and the sixth heat exchanger 1001 are in communication in series. The sixth heat exchanger 1001 is disposed in an air-conditioning box of a vehicle, and the first heat exchanger 101 is disposed outside the air-conditioning box of the vehicle.

Fourth Embodiment

Figure 4:
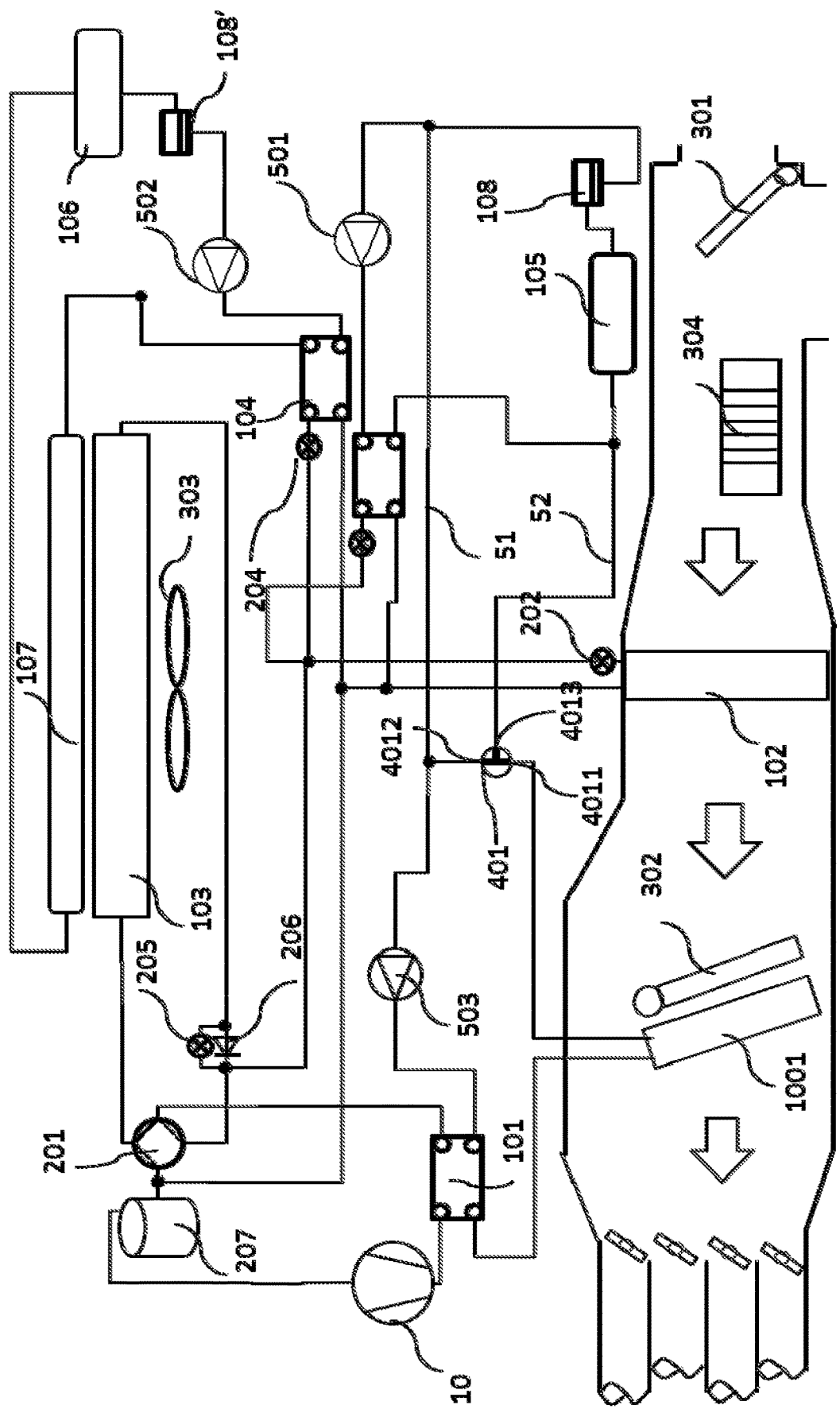
FIG. 4 is a schematic view of the connection of a fourth embodiment of the thermal management system.

Referring to FIG. 4, the third loop can exchange heat with the second loop or the first loop. In a specific embodiment, the thermal management system further includes a first communication pipeline 51 and a second communication pipeline 52. Each of the first communication pipeline 51 and the second communication pipeline 52 includes a first end and a second end. The first end of the first communication pipeline 51 is in communication with the second loop. The second end of the first communication pipeline 51 is in communication with the third loop. Similarly, the first end of the second communication pipeline 52 is in communication with the second loop. The second end of the second communication pipeline 52 is in communication with the third loop. The thermal management system can realize the exchange of the coolant of the second loop and the coolant of the third loop through the first communication pipeline 51 and the second communication pipeline 52, or the coolant in the second loop can flow into the third loop through the first communication pipeline 51 or the second communication pipeline 52. In other words, the coolant in the third loop can flow into the second loop through the first communication pipeline 51 or the second communication pipeline, and finally realize the heat exchange between the second loop and the third loop. Specifically, among the four ports of the first communication pipeline 51 and the second communication pipeline 52, at least one port is directly or indirectly communicated with the inlet of the third pump 503 or the second pump 501. For example, the second end of the first communication pipeline 51 is communicated with the inlet of the third pump 503. The second end of the first communication pipeline 51 is communicated with the second loop. Both ends of the second communication pipeline 52 are communicated with the second loop and the third loop. However, both ends of the second communication pipeline are not directly communicated with the third pump 503 or the second pump 501. This facilitates the flow of coolant in the second loop and the third loop to each other.

The third loop includes a third branch. The third branch includes a third pump 503, the coolant flow channel of the first heat exchanger 101 and a sixth heat exchanger 1001 communicated in series. In other words, the third branch is a discommunicated form of the third loop. The coolant system includes a third valve member 401. The third valve member 401 includes a first connecting port 4011, a second connecting port 4012 and a third connecting port 4013. The third valve member 401 can open or close a communication path between the first connecting port 4011 and the third connecting port 4013 or a communication path between the first connecting port 4011 and the second connecting port 4012. The first connecting port 4011 of the third valve member 401 and the second connecting port 4012 of the third valve member 401 are in communication with both ends of the third branch. The third connecting port 4013 of the third valve member 401 is in communication with one end of the second communication pipeline 52. The other end of the second communication pipeline 52 is in communication with one end of the second branch. Two ends of the first communication pipeline 51 communicate with the corresponding other ends of the second branch and the third branch. The thermal management system can control whether the second loop and the third loop perform coolant exchange through the third valve member 401. For example, when the first connecting port 4011 and the second connecting port 4012 of the third valve member 401 are communicated, and the first connecting port 4011 and the third connecting port 4013 of the third valve member 401 are not communicated, the coolant in the third loop flows in the third loop. In a circulation mode of the thermal management system, that is, when the third loop and the second loop need heat exchange, for example, when using the heat generated by the first heat exchanger 101 to increase the heat of the battery and other heat-generating device, or using the heat of the battery and other heat-generating device to heat the passenger compartment, the first connecting port 4011 and the second connecting port 4012 of the third valve member 401 are controlled not to be communicated, the first connecting port 4011 of the third valve member 401 is controlled to be communicated with the third connecting port 4013, the second loop and the third loop exchange the coolant, and finally realize the heat exchange between the second loop and the third loop. That is, the heat of the second loop is released in the third loop through the first communication pipeline 51 and the second communication pipeline 52 so as to increase the temperature of the passenger compartment. Alternatively, the heat of the third loop is released in the second loop through the first communication pipeline 51 and the second communication pipeline 52 so as to increase the temperature of the device such as the battery. In other embodiments, the third valve member 401 may only include two connecting ports, for example, the third valve member 401 includes a first connecting port and a second connecting port. The third valve member 401 can open or close a communication path between the first connecting port of the third valve member 401 and the second connecting port of the third valve member 401. The first connecting port of the third valve member 401 is in communication with the first communication pipeline 51. The second connecting port of the third valve member 401 is in communication with one end of the second branch or one end of the third branch. The second loop is controlled by the thermal management system to communicate with the third loop through the third valve member 401. Of course, the third valve member 401 may also be communicated with the second communication pipeline 52, which will not be described in detail. Of course, the coolant system may also include a fourth valve member. The communication mode of the fourth valve member is the same as the communication mode of the third valve member, which will not be described in detail. By providing the third valve member 401 and/or the fourth valve member, the thermal management system can further control the second loop and the third loop to exchange coolant, so as to save the energy of the thermal management system.

Fifth Embodiment

Figure 5:
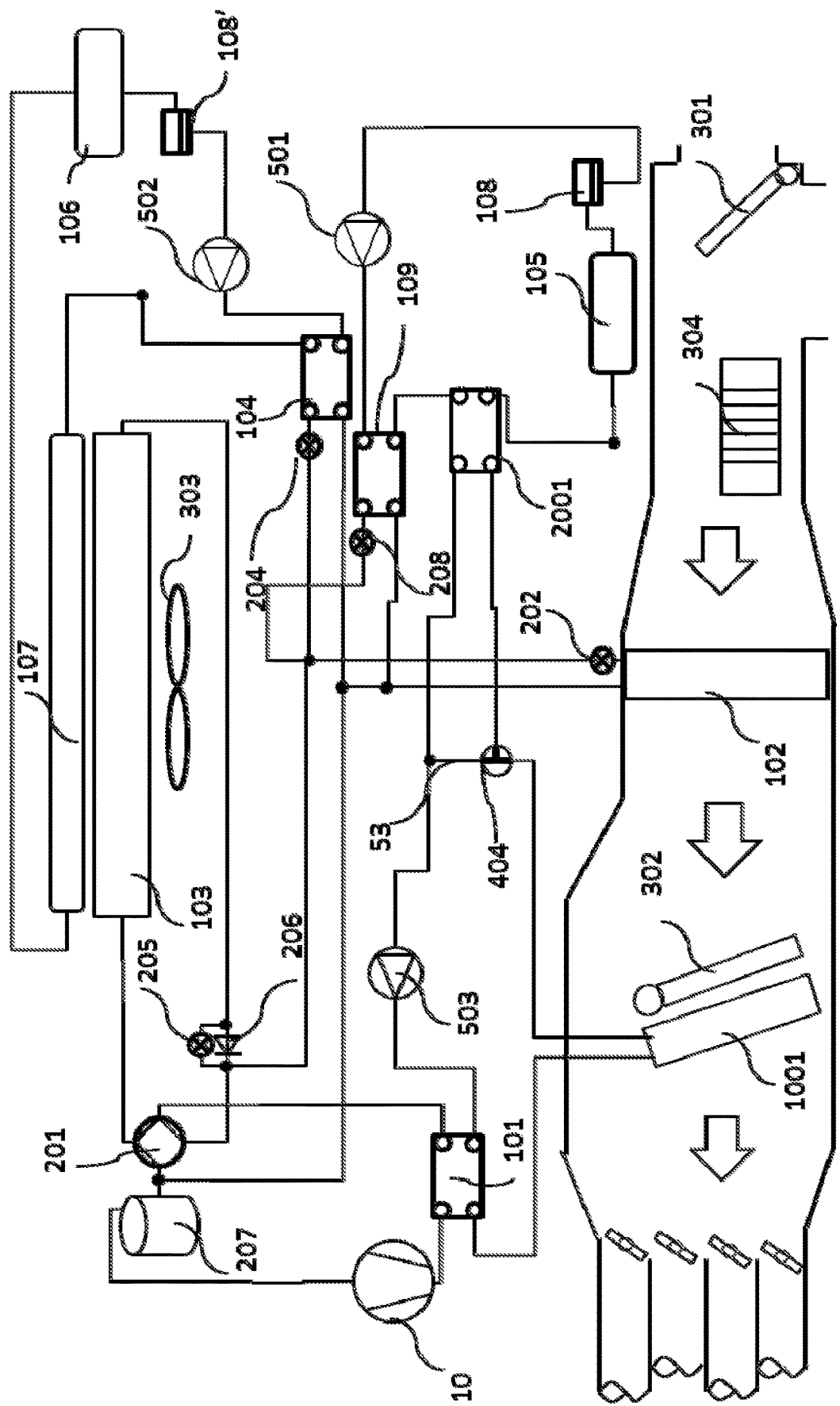
FIG. 5 is a schematic view of the connection of a fifth embodiment of the thermal management system.

Referring to FIG. 5, the coolant system includes a third dual-channel heat exchanger 2001. The third dual-channel heat exchanger 2001 defines a first flow channel and a second flow channel. The first flow channel of the third dual-channel heat exchanger 2001 is a part of the third loop. The second flow channel of the third dual-channel heat exchanger 2001 is a part of the second loop. The coolant of the second loop and the coolant of the third loop can exchange heat in the third dual-channel heat exchanger 2001. Compared with the above-mentioned embodiments, the second loop and the third loop only exchange heat and do not exchange coolant. Since the second loop is provided with the second pump 501 and the third loop is provided with the third pump 503, when the second loop and the third loop need heat exchange, the third pump 503 and the second pump 501 are turned on. In other words, the thermal management system can control whether the second loop and the third loop exchange heat by controlling the third pump 503 and the second pump 501. Further, referring to FIG. 5, the coolant system further includes a bypass pipeline 53 and a fifth valve member 404. The bypass pipeline 53 and the fifth valve member 404 are disposed in the third loop. The bypass pipeline 53 is disposed in parallel with the first flow channel of the third dual-channel heat exchanger 2001. By controlling the fifth valve member 404, the bypass pipeline 53 bypasses the first flow channel of the third dual-channel heat exchanger 2001. Of course, the bypass pipeline 53 and the fifth valve member 404 can also be disposed in the second loop. The bypass pipeline 53 can bypass the second flow channel of the third dual-channel heat exchanger 2001, which will not be described in detail. By providing the bypass pipeline 53 and the fifth valve member 404, the second loop and the third loop of the thermal management system can operate independently and simultaneously when the second loop and the third loop do not exchange heat, which is convenient for control.

Sixth Embodiment

Figure 6:
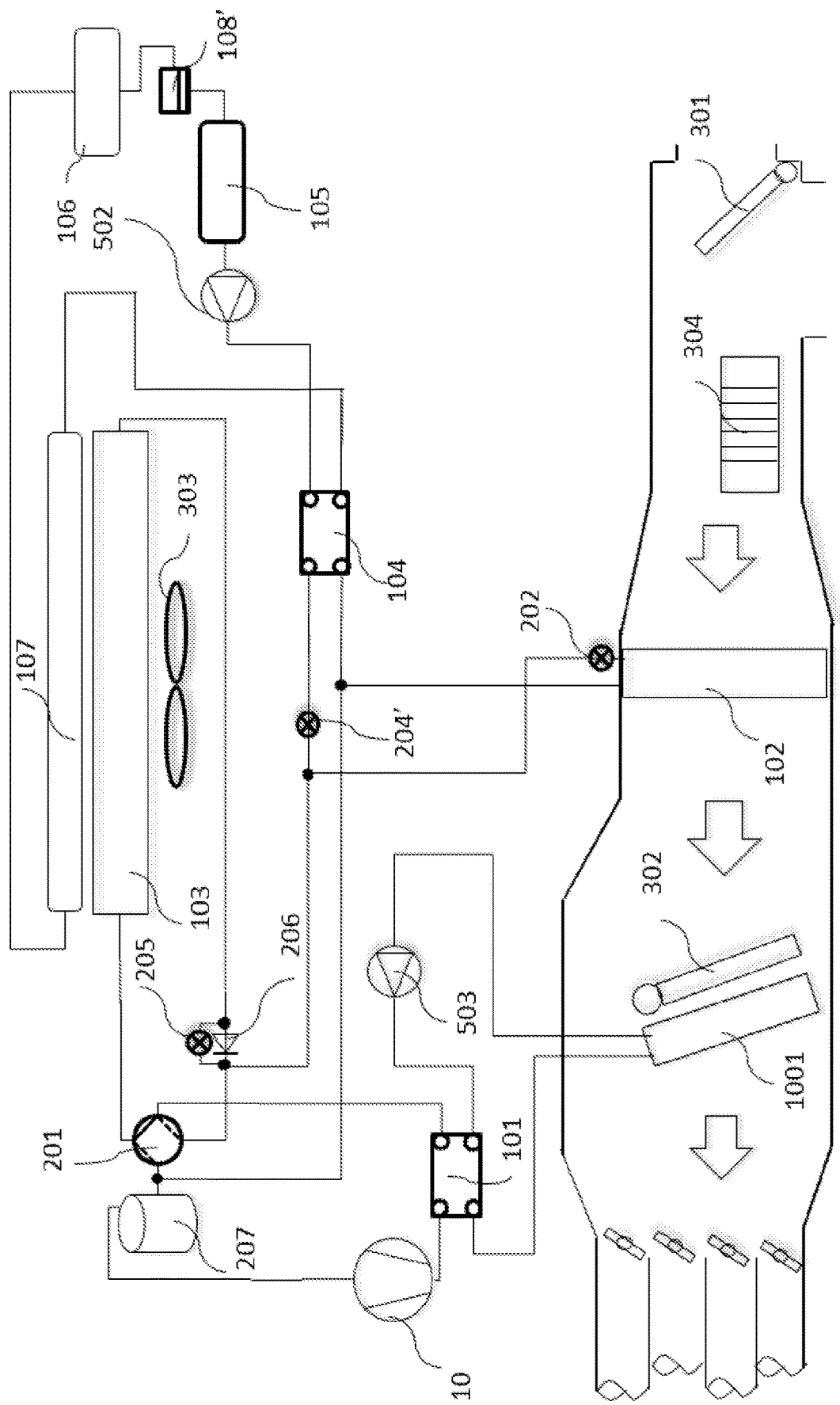
FIG. 6 is a schematic view of the connection of a sixth embodiment of the thermal management system.

Referring to FIG. 6, compared with the embodiment shown in FIG. 3, the thermal management system includes the first dual-channel heat exchanger 104, but does not include the second dual-channel heat exchanger 109. The third heat exchanger 105 is disposed in the first loop. In other words, the first loop includes the third heat exchanger 105. In this embodiment, the second heat exchanger 106 and the third heat exchanger 105 are in communication in series. In other embodiments, the second heat exchanger 106 and the third heat exchanger 105 may also be communicated in series with the first pump 502 after being communicated in parallel.

Seventh Embodiment

Figure 7:
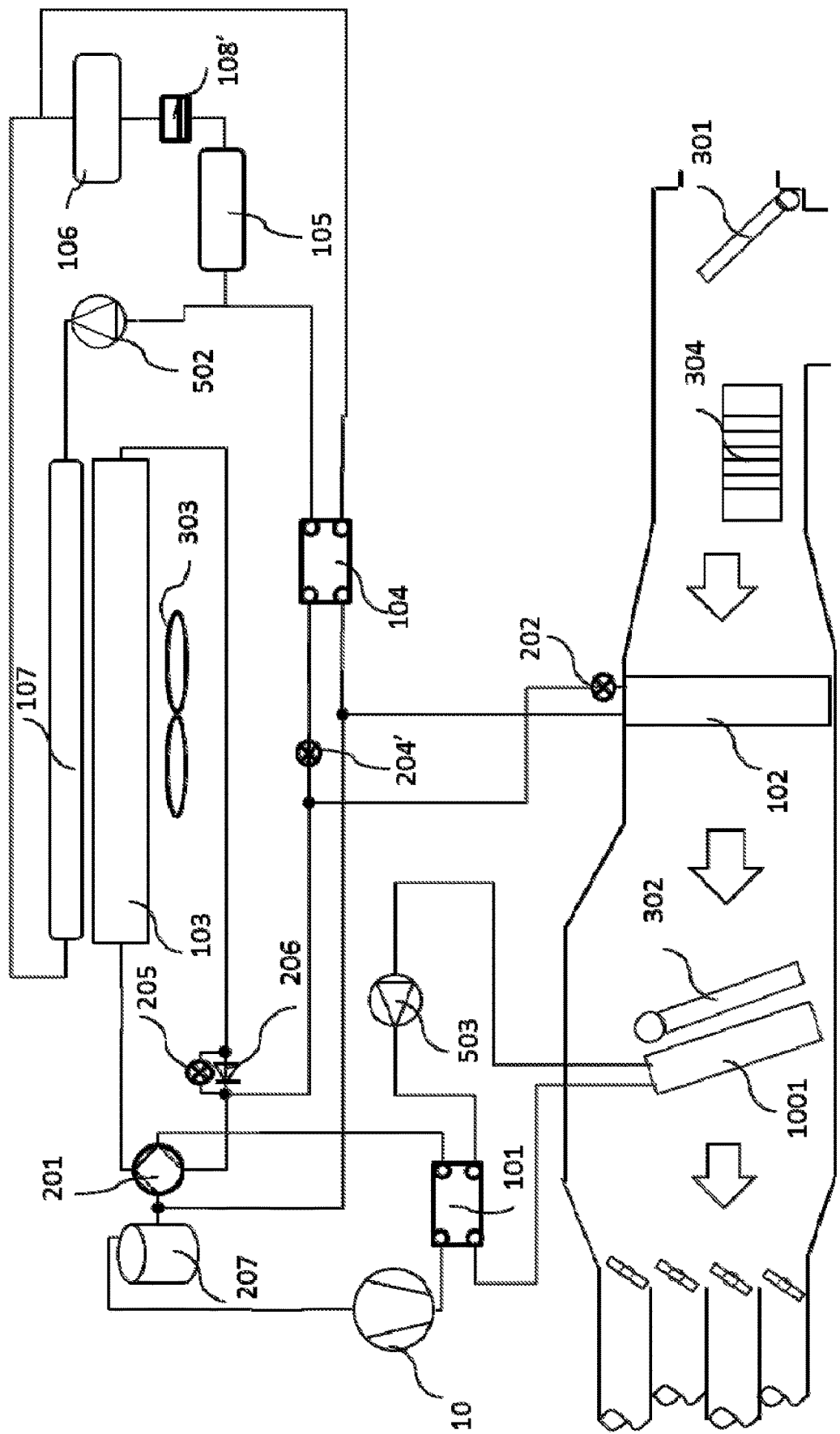
FIG. 7 is a schematic view of the connection of a seventh embodiment of the thermal management system.

Referring to FIG. 7, the second heat exchanger 106 and the third heat exchanger 105 are in communication in series or in parallel, then communicated with the coolant flow channel of the first dual-channel heat exchanger 104 in parallel, and then communicated with the first pump 502 and the fourth heat exchanger in series. The second heat exchanger and the third heat exchanger are disposed in the same loop, so that the thermal management system has the advantage of being relatively simple.

Eighth Embodiment

Figure 8:
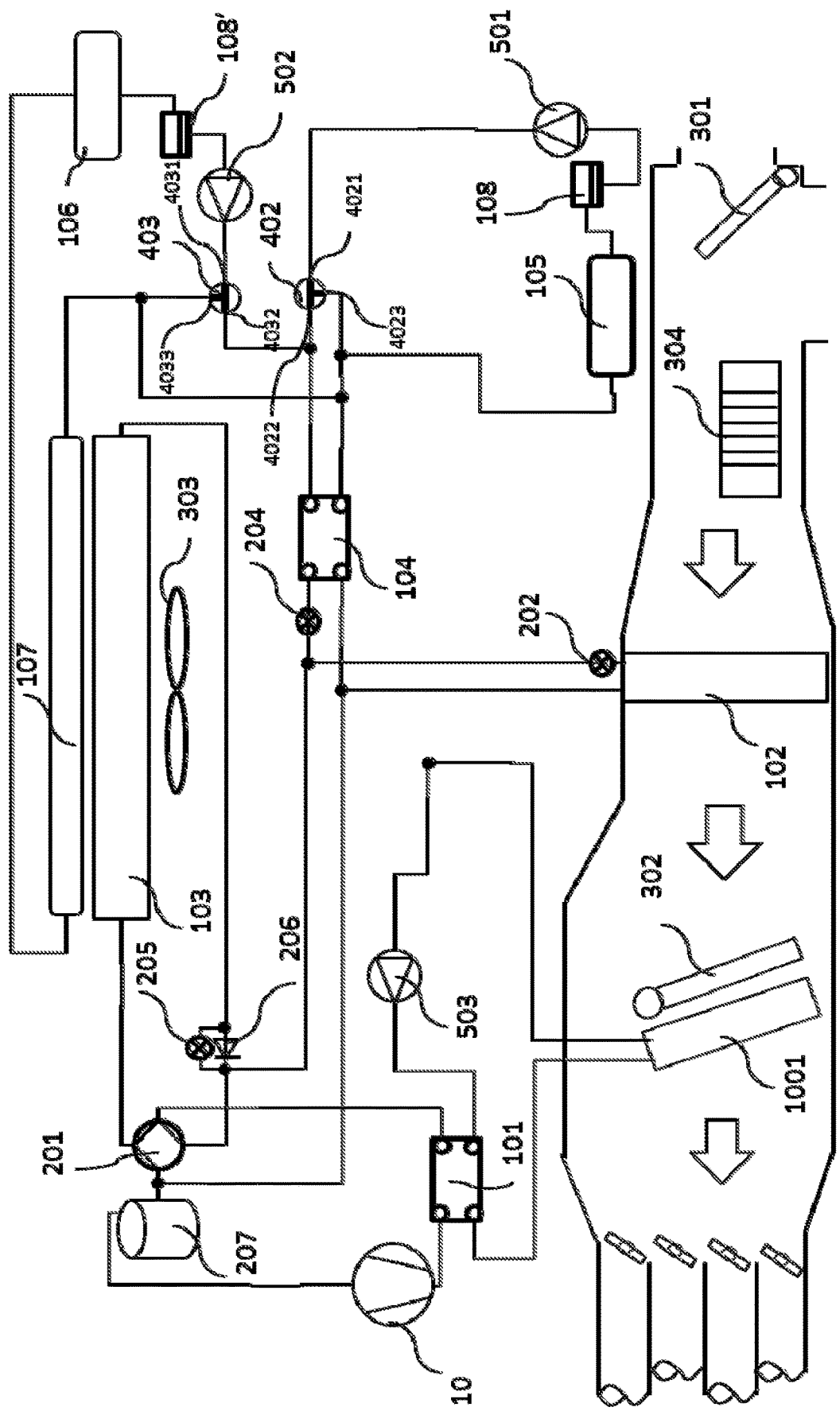
FIG. 8 is a schematic view of the connection of an eighth embodiment of the thermal management system.

Referring to FIG. 8, in this embodiment, the fourth heat exchanger 107 is disposed in the first branch. Of course, the fourth heat exchanger 107 can also be disposed in the second branch, or both the first branch and the second branch are provided with the fourth heat exchanger 107. Compared with the embodiment shown in FIG. 3, the coolant system includes a second valve member 402. In this embodiment, the second valve member 402 is a three-way valve. A first mating port 4021 of the second valve member 402 can be in communication with a second mating port 4022 of the second valve member 402 or a third mating port 4023 of the second valve member 402. The first mating port 4021 of the second valve member 402 can be in communication with a port of the second branch. The second mating port 4022 of the second valve member 402 can be in communication with one port of the coolant flow channel of the first dual-channel heat exchanger 104. The other port of the second branch and the other port of the coolant flow channel of the first dual-channel heat exchanger 104 can be in communication with the third mating port 4023 of the second valve member 402. When the first mating port 4021 of the second valve member 402 is communicated with the third mating port 4023, and the first mating port 4021 of the second valve member 402 is not communicated with the second mating port 4022, the second valve member 402 and the second branch form a second loop, and the coolant flow channel of the first dual-channel heat exchanger 104 is not communicated with the second loop. When the first mating port 4021 of the second valve member 402 is not communicated with the third mating port 4023, and the first mating port 4021 of the second valve member 402 is communicated with the second mating port 4022, the coolant flow channel of the first dual-channel heat exchanger 104 is in communication with the first branch. That is, the coolant flow channel of the first dual-channel heat exchanger 104, the second pump 501 and the third heat exchanger 105 are in communication in series. In other embodiments, the second valve member 402 may also be a combination of two shut-off valves or flow regulating valves, which will not be described in detail. When the thermal management system is working, the coolant flow channel of the first dual-channel heat exchanger 104 can be communicated with the first branch or the second branch. It should be explained that "the coolant flow channel of the first dual-channel heat exchanger 104 can be communicated with the first branch or the second branch" mentioned here refers to the coolant in the coolant flow channel of the first dual-channel heat exchanger 104 can flow into and out of the first branch or the second branch. In other words, the coolant of the first branch or the second branch can flow into and out of the coolant flow channel of the first dual-channel heat exchanger 104.

The coolant system includes a first valve member 403. In this embodiment, the first valve member 403 is a three-way valve. The first valve member 403 has three connection ports. A first connection port 4031 of the first valve member 403 can be in communication with a second connection port 4032 of the first valve member 403 or a third connection port 4033 of the first valve member 403. The first connection port 4031 of the first valve member 403 is in communication with one port of the first branch. The second connection port 4032 of the first valve member 403 is in communication with one port of the coolant flow channel of the first dual-channel heat exchanger 104. The third connection port 4033 of the first valve member 403 and the other port of the coolant flow channel of the first dual-channel heat exchanger 104 can be in communication with the other port of the first branch. When the first connection port 4031 of the first valve member 403 is in communication with the third connection port 4033, and the first connection port 4031 of the first valve member 403 is not communicated with the second connection port 4032, the first valve member 403 and the first branch form a first loop, and the coolant flow channel of the first dual-channel heat exchanger 104 is not communicated with the first loop. When the first connection port 4031 of the first valve member 403 is not communicated with the third connection port 4033, and the first connection port 4031 of the first valve member 403 is communicated with the second connection port 4032, the coolant flow channel of the first heat exchanger 104 is in communication with the first branch. That is, the coolant flow channel of the first dual-channel heat exchanger 104, the first pump 502, and the second heat exchanger 106 are in communication in series. At this time, the heat of the coolant in the first branch can be released to the refrigerant system through the first dual-channel heat exchanger 104. In other embodiments, the first valve member 403 may also be a combination of two shut-off valves or flow regulating valves, which will not be described in detail. At this time, by controlling the first valve member 403 and the second valve member 402, the coolant flow channel of the first dual-channel heat exchanger 104 can be communicated with the first loop, or the coolant flow channel of the first dual-channel heat exchanger 104 is communicated with the second loop. Taking the first branch and the coolant flow channel of the first dual-channel heat exchanger 104 as an example, the heat-generating device such as the motor exchanges heat with the second heat exchanger 106, and the coolant in the second heat exchanger 106 absorbs the heat of the heat-generating device such as the motor. The refrigerant flowing through the first dual-channel heat exchanger 104 obtains the heat absorbed by the second heat exchanger 106 from heat-generating device such as the motor through the first dual-channel heat exchanger 104, and is released to the air-conditioning box through the eighth heat exchanger 102. At this time, there are two heat sources for the thermal management system, which are the air outside the air-conditioning box of the vehicle and the heat-generating device such as the motor. When the fourth heat exchanger 107 is also disposed in the first loop, the fourth heat exchanger 107 can absorb heat from the environment air, which is equivalent to increasing the heat exchange area of the seventh heat exchanger. As a result, it is beneficial to improve the heat exchange performance. Similarly, the heat absorbed by the second heat exchanger 106 from the heat-generating device such as the motor can also be released through the fourth heat exchanger 107 to reduce the temperature of the heat-generating device such as the motor.

The refrigerant suitable for the refrigerant system can be a conventional refrigerant, such as R134a, or a refrigerant with a supercritical state, such as $CO_2$. If the refrigerant system uses $CO_2$ as the refrigerant, the eighth heat exchanger 102 may be a dual-channel heat exchanger. At this time, the eighth heat exchanger 102 is disposed outside the air-conditioning box. In this way, the refrigerant system is all disposed outside the air-conditioning box, which is helpful to prevent the health of passengers from being harmed when $CO_2$ escapes. Due to the high working pressure of $CO_2$, the refrigerant system components working under high pressure are located outside the air-conditioning box, which is also helpful to prevent damage to passengers due to accidental explosion of the components.

Ninth Embodiment

Figure 9:
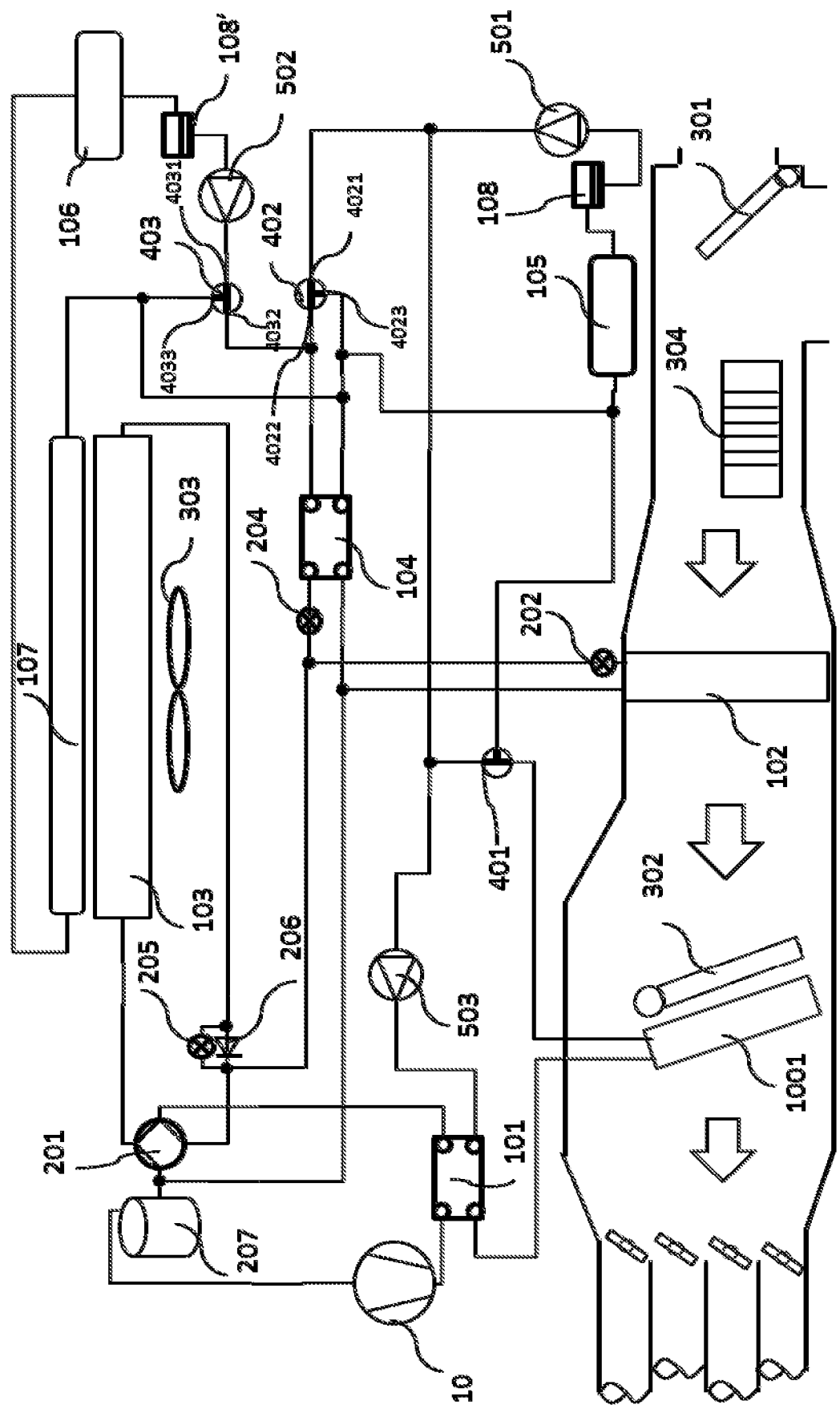
FIG. 9 is a schematic view of the connection of a ninth embodiment of the thermal management system.

Referring to FIG. 9, in this embodiment, the refrigerant system includes a compressor 10 and a first throttling device 204. The first dual-channel heat exchanger 104 of the thermal management system has a refrigerant flow channel and a coolant flow channel. The refrigerant flowing through the refrigerant flow channel and the coolant flowing through the coolant flow channel can exchange heat in the first dual-channel heat exchanger 104. An inlet of the refrigerant flow channel of the first dual-channel heat exchanger 104 is in communication with the first throttling device 204. An outlet of the refrigerant flow channel of the first dual-channel heat exchanger 104 is in communication with the inlet of the compressor 10 or is in communication with the inlet of the compressor 10 via a gas-liquid separator 207. The coolant system includes a first loop and a second loop. The first loop and the second loop can operate independently of each other. The first loop includes a second heat exchanger 106 and a first pump 502. The second heat exchanger 106 and the first pump 502 are in communication in series so as to form a first loop. The first pump 502 can drive the coolant to flow in the first loop. The second heat exchanger 106 can be used to adjust the temperature of a heat-generating device such as a motor. The heat-generating device such as the motor can directly or indirectly exchange heat with the coolant in the second heat exchanger 106, thereby adjusting the temperature of the heat-generating device such as the motor. The second loop includes a third heat exchanger 105 and a second pump 501. The third heat exchanger 105 and the second pump 501 are in communication in series so as to form a second loop. The second pump 501 can drive the coolant to flow in the second loop. The third heat exchanger 105 can be used to adjust the temperature of a heat-generating device such as a battery. The heat-generating device such as the battery can directly or indirectly exchange heat with the coolant in the third heat exchanger 105, thereby adjusting the temperature of the heat-generating device such as the battery.

Specifically, the first loop includes a first branch. The first branch includes the second heat exchanger 106 and the first pump 502. The second heat exchanger 106 is in communication with the first pump 502. The first branch has two ports. The two ports of the first branch are an inlet of the first branch and an outlet of the first branch, respectively. The two ports of the first branch can be openings of a device or openings of a pipeline. The coolant system includes a first valve member 403. In this embodiment, the first valve member 403 is a three-way valve. The first valve member 403 has three connection ports. A first connection port 4031 of the first valve member 403 can be in communication with a second connection port 4032 of the first valve member 403 or a third connection port 4033 of the first valve member 403. The first connection port 4031 of the first valve member 403 is in communication with one port of the first branch. The second connection port 4032 of the first valve member 403 is in communication with one port of the coolant flow channel of the first dual-channel heat exchanger 104. The third connection port 4033 of the first valve member 403 and the other port of the coolant flow channel of the first dual-channel heat exchanger 104 can be in communication with the other port of the first branch. When the first connection port 4031 of the first valve member 403 is in communication with the third connection port 4033, and the first connection port 4031 of the first valve member 403 is not communicated with the second connection port 4032, the first valve member 403 and the first branch form a first loop, and the coolant flow channel of the first dual-channel heat exchanger 104 is not communicated with the first loop. When the first connection port 4031 of the first valve member 403 is not communicated with the third connection port 4033, and the first connection port 4031 of the first valve member 403 is communicated with the second connection port 4032, the coolant flow channel of the first dual-channel heat exchanger 104 is in communication with the first branch. That is, the coolant flow channel of the first dual-channel heat exchanger 104, the first pump 502, and the second heat exchanger 106 are in communication in series. At this time, the heat of the coolant in the first branch can be released to the refrigerant system through the first dual-channel heat exchanger 104. In other embodiments, the first valve member 403 may also be a combination of two shut-off valves or flow regulating valves, which will not be described in detail.

The second loop includes a second branch. The second branch includes a third heat exchanger 105 and a second pump 501. The second branch has two ports. The two ports of the second branch are an inlet of the coolant into the second branch and an outlet of the second branch, respectively. The two ports of the second branch can be openings of a device or openings of a pipeline. The coolant system includes a second valve member 402. In this embodiment, the second valve member 402 is a three-way valve. A first mating port 4021 of the second valve member 402 can be in communication with a second mating port 4022 of the second valve member 402 or a third mating port 4023 of the second valve member 402. The first mating port 4021 of the second valve member 402 can be in communication with one port of the second branch. The second mating port 4022 of the second valve member 402 can be in communication with one port of the coolant flow channel of the first dual-channel heat exchanger 104. The other port of the second branch and the other port of the coolant flow channel of the first dual-channel heat exchanger 104 can be in communication with the third mating port 4023 of the second valve member 402. When the first mating port 4021 of the second valve member 402 is communicated with the third mating port 4023, and the first mating port 4021 of the second valve member 402 is not communicated with the second mating port 4022, the second valve member 402 and the second branch form a second loop, and the coolant flow channel of the first dual-channel heat exchanger 104 is not communicated with the second loop. When the first mating port 4021 of the second valve member 402 is not communicated with the third mating port 4023, and the first mating port 4021 of the second valve member 402 is communicated with the second mating port 4022, the coolant flow channel of the first dual-channel heat exchanger 104 is in communication with the first branch. That is, the coolant flow channel of the first dual-channel heat exchanger 104, the second pump 501 and the third heat exchanger 105 are in communication in series. In other embodiments, the second valve member 402 may also be a combination of two shut-off valves or flow regulating valves, which will not be described in detail.

The coolant system also includes a fourth heat exchanger 107. In a technical solution of the present disclosure, the fourth heat exchanger 107 is disposed in the first branch. In other words, the fourth heat exchanger 107 is a part of the first branch. The fourth heat exchanger 107 may be an air-cooled heat exchanger, such as a microchannel heat exchanger. The fourth heat exchanger 107, the first pump 502 and the second heat exchanger 106 are in communication in series. In the thermal management system for the vehicle, the fourth heat exchanger 107 is disposed outside the air-conditioning box of the vehicle, and the fourth heat exchanger 107 can exchange heat with the environment air. Specifically, when the temperature of the heat-generating device such as the motor is high and needs to be dissipated, the coolant in the first loop only circulates in the first loop, and the heat of the heat-generating device such as the motor is released into the air through the fourth heat exchanger 107. At this time, it is not necessary to turn on the compressor 10 to realize the temperature control of the heat-generating device such as the motor, which can save energy. In other embodiments, the fourth heat exchanger 107 may also be disposed in parallel with the second heat exchanger 106 and then communicate with the first pump 502 in series. In other words, the fourth heat exchanger 107 is in serial communication with the first pump 502, the second heat exchanger 106 and the first pump 502 are also communicated in series, and the second heat exchanger 106 and the fourth heat exchanger 107 are disposed in parallel. In other technical solutions of the present disclosure, the fourth heat exchanger 107 may be disposed in the second branch. Of course, the coolant system may also include two fourth heat exchangers 107, one of which is disposed in the first branch, and the other of which is disposed in the second branch. In the direction of gravity, the height of the two ports of the first branch is higher than that of the coolant flow channel of the first heat exchanger 101. The height of the two ports of the second branch is higher than the coolant flow channel of the first heat exchanger 101. As a result, it can reduce the flow of the higher-temperature coolant to the lower-temperature coolant, reduce heat exchange and reduce heat loss.

The first heat exchanger 101 is a dual-channel heat exchanger. The first heat exchanger 101 includes a refrigerant flow channel and a coolant flow channel. The refrigerant flow channel of the first heat exchanger 101 exchanges heat with the coolant flow channel. The coolant system further includes a third loop which can exchange heat with the second loop or the first loop. The third loop includes a third branch. The third branch includes a third pump 503, the coolant flow channel of the first heat exchanger 101 and a sixth heat exchanger 1001 communicated in series. The coolant system includes a third valve member 401. The thermal management system can control whether the second loop and the third loop perform coolant exchange through the third valve member 401. In the circulation mode of the thermal management system, that is, when the third loop and the second loop need to exchange heat, for example, when using the heat generated by the first heat exchanger 101 to increase the heat of the heat-generating device such as the battery, or using the heat of the heat-generating device such as the battery to heat up the passenger compartment, the third valve member is controlled to exchange the coolant in the second loop and the third loop, and finally the heat exchange between the second loop and the third loop is realized. The heat of the second loop is released in the third loop so as to increase the temperature of the passenger compartment. The first heat exchanger 101 is disposed outside the air-conditioning box. The sixth heat exchanger 1001 is in communication with the coolant flow channel of the first heat exchanger 101. The sixth heat exchanger 1001 is disposed in the air-conditioning box, so that the sixth heat exchanger 1001 can adjust the temperature in the passenger compartment of the vehicle. The seventh heat exchanger 103 and the fourth heat exchanger 107 are disposed outside the air-conditioning box of the vehicle. Specifically, the seventh heat exchanger 103 and the fourth heat exchanger 107 are provided in a front-end module of the vehicle.

Tenth Embodiment

Figure 10:
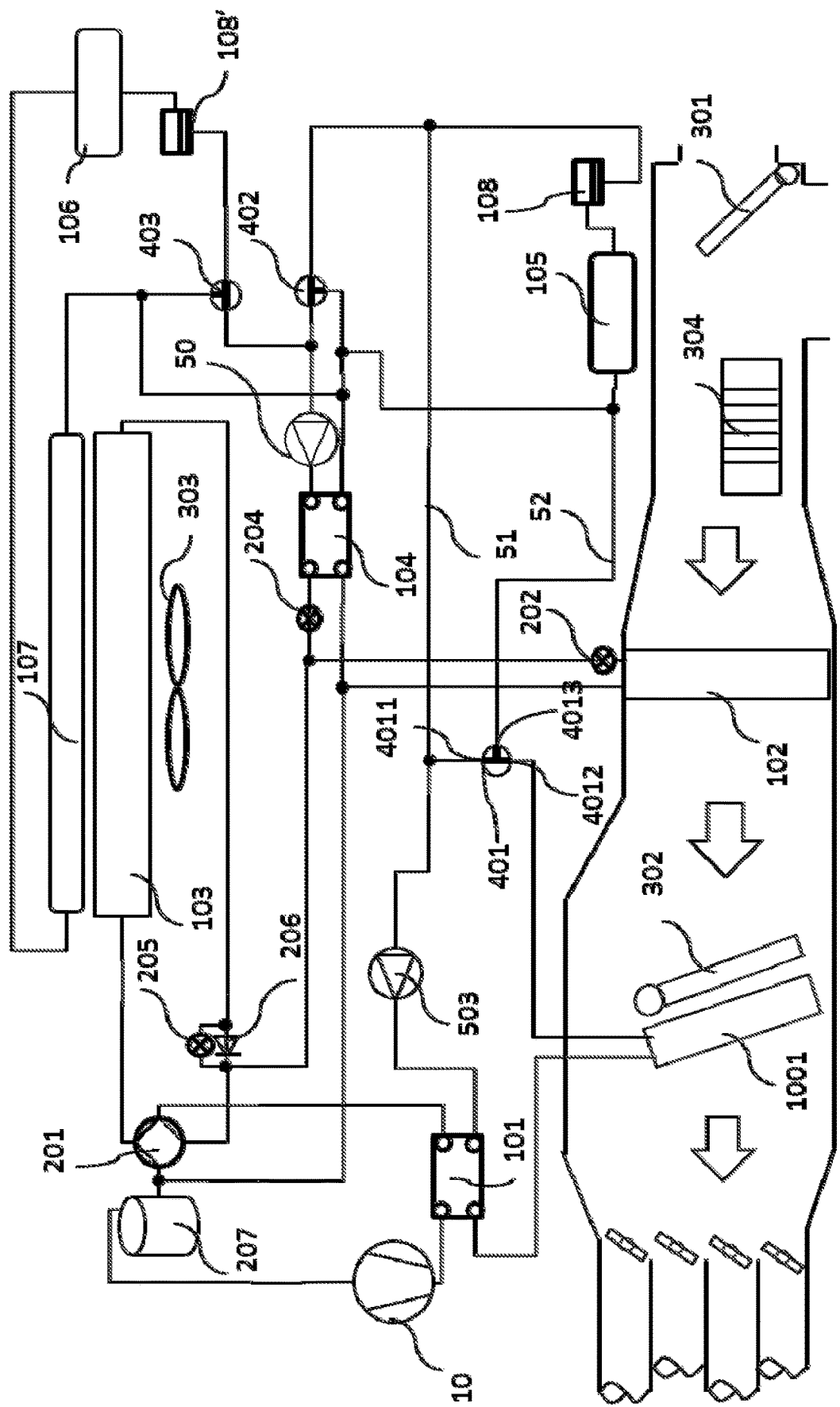
FIG. 10 is a schematic view of the connection of a tenth embodiment of the thermal management system.

Referring to FIG. 10, the coolant system can also be provided with only one pump 50. An outlet of the pump 50 is in communication with a port of the coolant flow channel of the first dual-channel heat exchanger 104. The second connection port 4032 of the first valve member 403 is in communication with the coolant flow channel of the first dual-channel heat exchanger 104 through the outlet of the pump 50. Compared with the embodiment shown in FIG. 9, the thermal management system can save one pump and relatively reduce the cost.

Referring to FIG. 10, the first heat exchanger 101 is a dual-channel heat exchanger. For example, the first heat exchanger 101 may be a plate heat exchanger. The first heat exchanger 101 includes a refrigerant flow channel and a coolant flow channel. The outlet of the compressor 10 is in communication with the inlet of the refrigerant flow channel of the first heat exchanger 101. The high-temperature and high-pressure refrigerant can release heat in the refrigerant flow channel of the first heat exchanger 101 to increase the heat of the coolant in the coolant flow channel. The thermal management system includes a third loop. The third loop includes a third pump 503, the coolant flow channel of the first heat exchanger 101 and a sixth heat exchanger 1001. The third pump 503, the coolant flow channel of the first heat exchanger 101 and the sixth heat exchanger 1001 are in communication in series. The sixth heat exchanger 1001 is disposed in the air-conditioning box of the vehicle, and the first heat exchanger 101 is disposed outside the air-conditioning box of the vehicle. The third loop can exchange heat with the second loop or the first loop. In a specific embodiment, the thermal management system further includes a first communication pipeline 51 and a second communication pipeline 52. The thermal management system can realize the exchange of the coolant of the second loop and the coolant of the third loop through the first communication pipeline 51 and the second communication pipeline 52. In other words, the coolant in the second loop can flow into the third loop through the first communication pipeline 51 or the second communication pipeline 52, or the coolant in the third loop can flow into the second loop through the first communication pipeline 51 or the second communication pipeline, and finally realize the heat exchange between the second loop and the third loop.

Eleventh Embodiment

Figure 11:
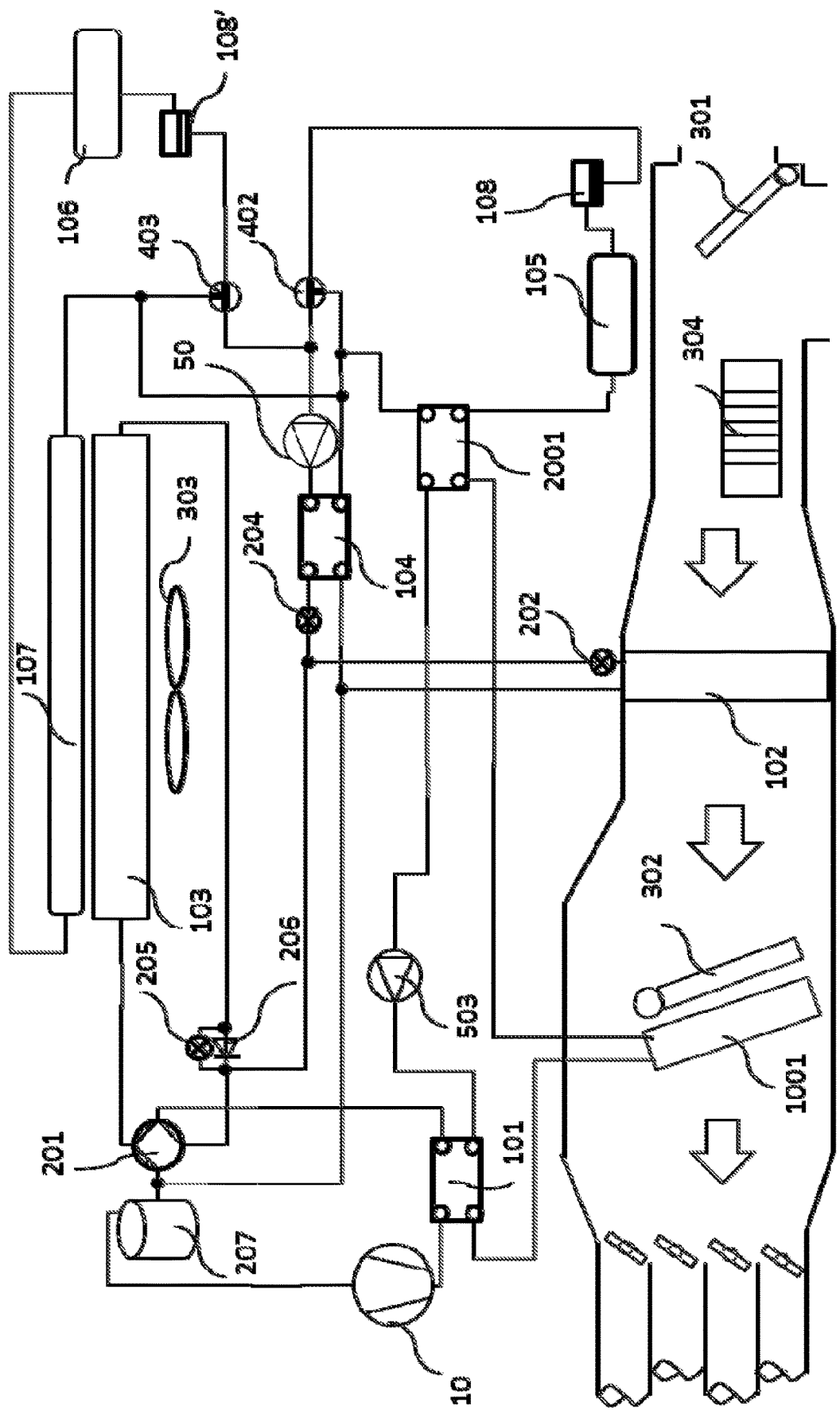
FIG. 11 is a schematic view of the connection of an eleventh embodiment of the thermal management system.

Referring to FIG. 11, the coolant system includes a third dual-channel heat exchanger 2001. The third dual-channel heat exchanger 2001 defines a first flow channel and a second flow channel. The first flow channel of the third dual-channel heat exchanger 2001 is a part of the third loop. The second flow channel of the third dual-channel heat exchanger 2001 is a part of the second loop. The coolant of the second loop and the coolant of the third loop can exchange heat in the third dual-channel heat exchanger 2001. Compared with the above-mentioned embodiments, the second loop and the third loop only exchange heat and do not exchange coolant.

Twelfth Embodiment

Figure 12:
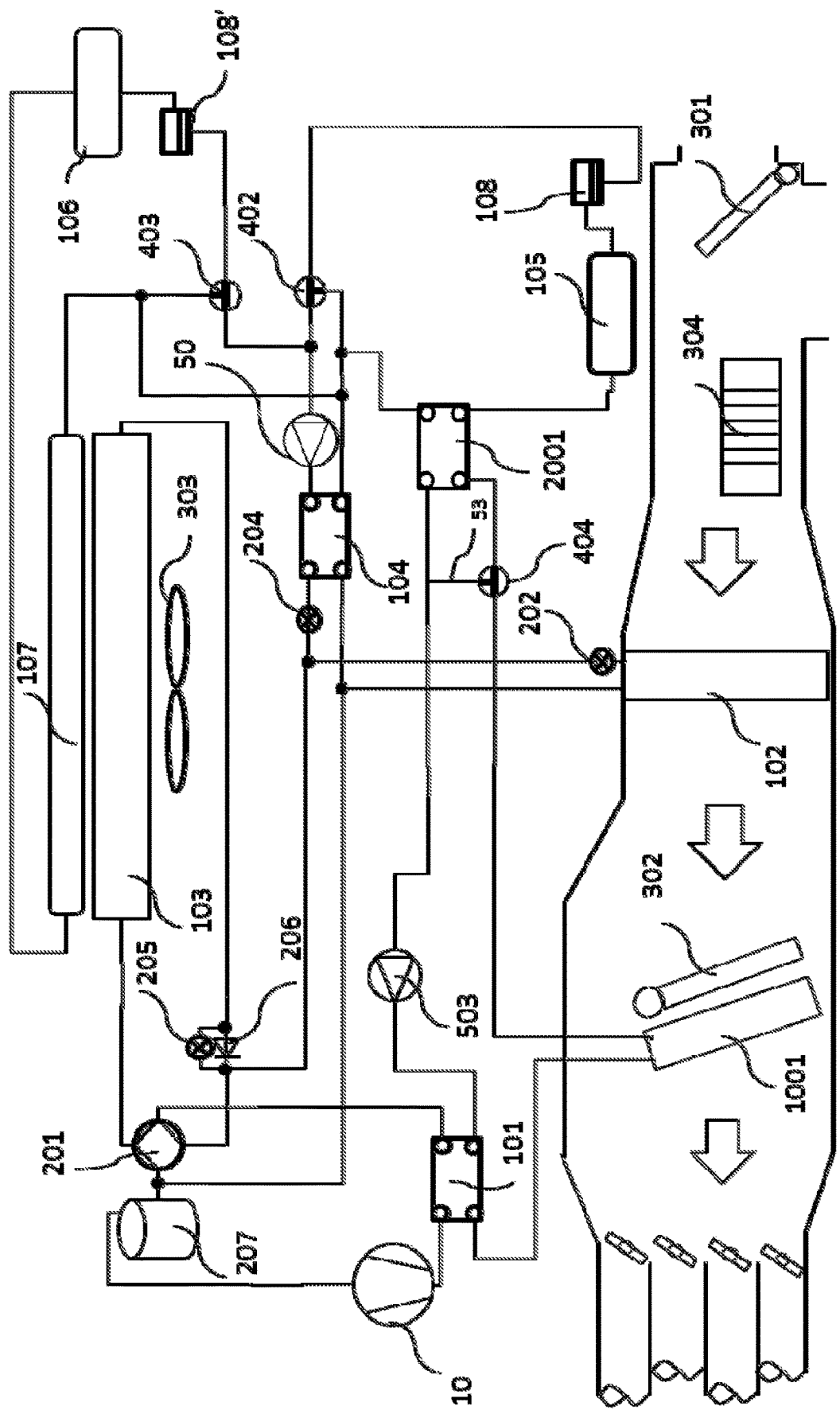
FIG. 12 is a schematic view of the connection of a twelfth embodiment of the thermal management system.

Further, referring to FIG. 12, the coolant system also includes a bypass pipeline 53. The bypass pipeline 53 is provided in the third loop. The bypass pipeline 53 is disposed in parallel with the first flow channel of the third dual-channel heat exchanger 2001. The bypass pipeline 53 can bypass the first flow channel of the third dual-channel heat exchanger 2001. Of course, in order to control whether the bypass pipeline 53 bypasses the first flow channel of the third dual-channel heat exchanger 2001, the thermal management system is also provided with a corresponding fifth valve member 404. Of course, the bypass pipeline 53 can also be disposed in the second loop, and the bypass pipeline 53 can bypass the second flow channel of the third dual-channel heat exchanger 2001, which will not be described in detail. The thermal management system is provided with a bypass pipeline 53. By providing the bypass pipeline 53, the second loop and the third loop of the thermal management system can operate independently and simultaneously without heat exchange, which is convenient for control.

Thirteenth Embodiment

Figure 13:
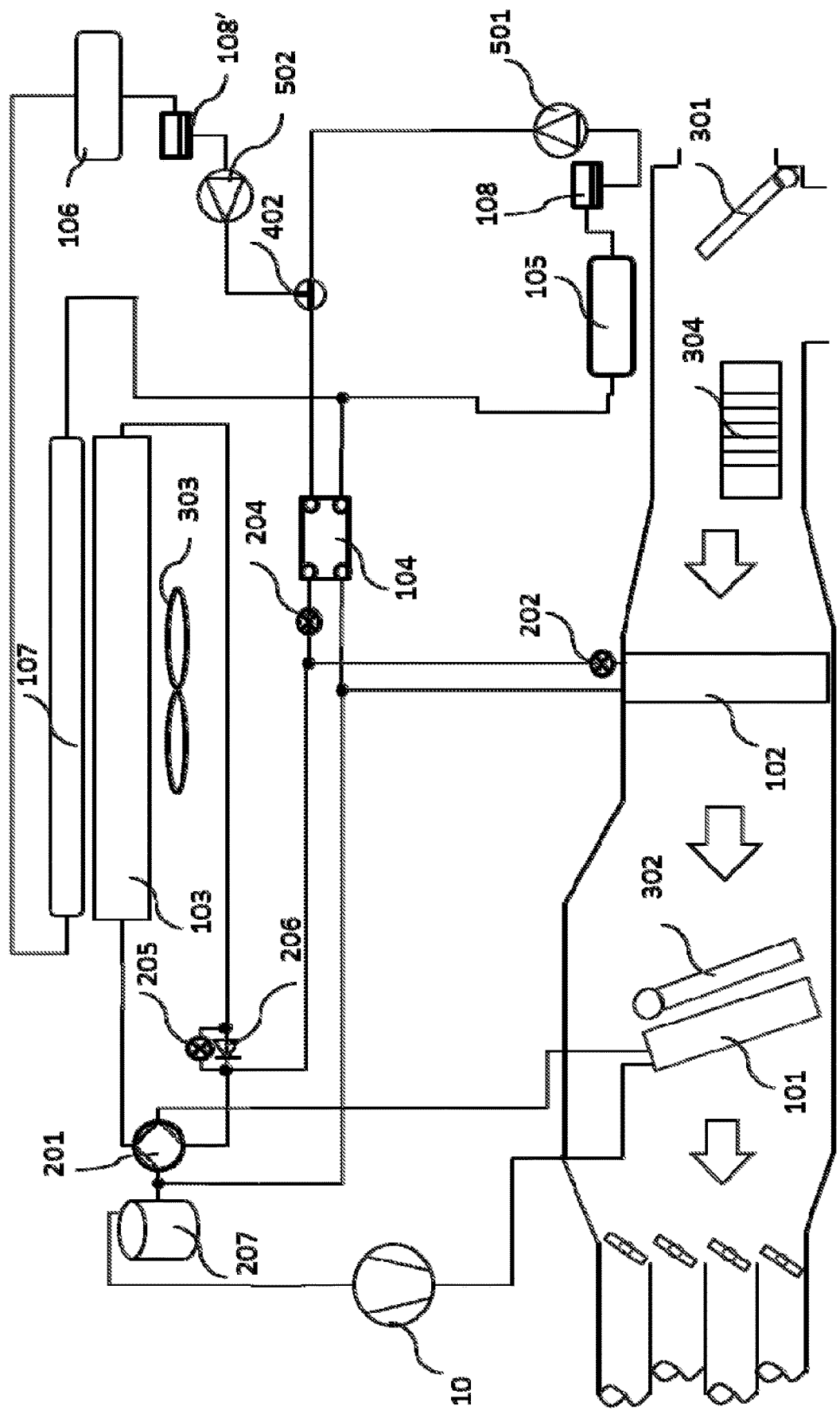
FIG. 13 is a schematic view of the connection of a thirteenth embodiment of the thermal management system.

Referring to FIG. 13, compared with the embodiment shown in FIG. 9, the coolant system only includes one valve member, such as a second valve member 402. The second valve member 402 is a three-way valve. The first mating port 4021 of the second valve member 402 is in communication with one port of the coolant flow channel of the first dual-channel heat exchanger 104. The second mating port 4022 of the second valve member 402 and the third mating port 4023 of the second valve member 402 are communicated with one end of the first branch and one end of the second branch, respectively. The other end of the first branch and the other end of the second branch are in communication with the other port of the coolant flow channel of the first dual-channel heat exchanger 104. When the first mating port 4021 of the second valve member 402 is in communication with the second mating port 4022 or the third mating port 4023, the coolant flow channel of the first dual-channel heat exchanger 104 is in communication with the first branch or the second branch. The heat of the air around the fourth heat exchanger 107 can be pumped to the refrigerant system through the first heat exchanger. The heat of the motor or the battery can be released into the air through the fourth heat exchanger. Compared with the embodiment shown in FIG. 9, the thermal management system is relatively simple.

Fourteenth Embodiment

Figure 14:
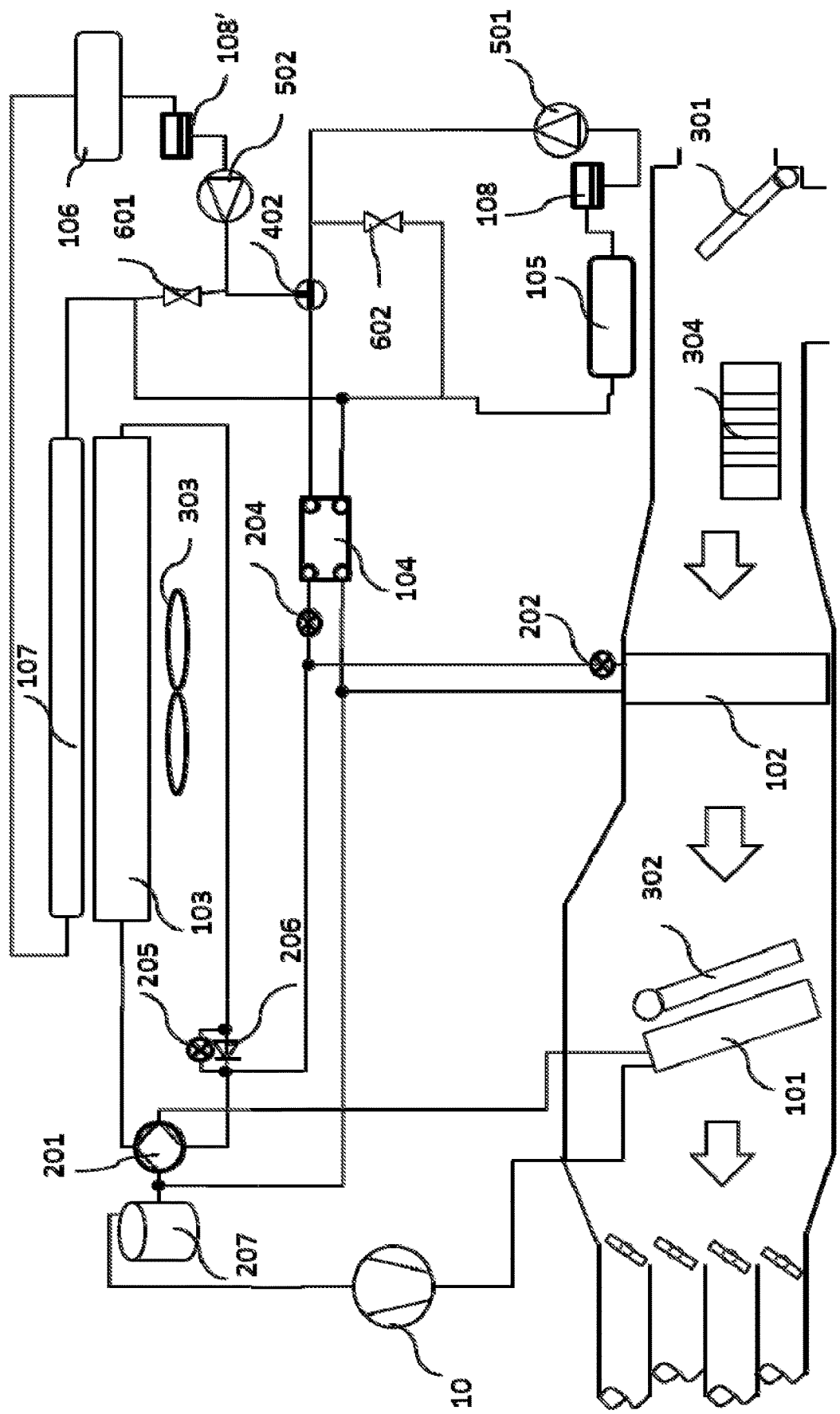
FIG. 14 is a schematic view of the connection of a fourteenth embodiment of the thermal management system.

Referring to FIG. 14, compared with the embodiment shown in FIG. 13, the thermal management system includes a first shut-off valve 601. A first port of the first shut-off valve 601 is in communication with one port of the first branch. A second port of the first shut-off valve 601 is in communication with the other port of the first branch. The thermal management system includes a second shut-off valve 602. A first port of the second shut-off valve 602 is in communication with one port of the second branch. A second port of the second shut-off valve 602 is in communication with the other port of the second branch. When the thermal management system is working, the first shut-off valve is opened, and the first branch can form a first loop through the first shut-off valve 601. The coolant in the first loop flows under the driving of the first pump 502, and the heat of the heat-generating device such as the motor can be released into the air through the fourth heat exchanger 107. Similarly, when the thermal management system is working, the second shut-off valve is opened, and the second branch can form a second loop through the second shut-off valve 602. The coolant in the second loop flows under the driving of the second pump 501. The heat of the heat-generating device, such as the battery, can be released into the air through the fourth heat exchanger 107. By providing the first shut-off valve 601 and the second shut-off valve 602 in the coolant system, the first loop and the second loop can be operated independently at the same time or only one of them can be operated. Of course, the coolant system can also be provided with only one shut-off valve, such as the first shut-off valve or the second shut-off valve.

It should be noted that the above embodiments are only used to illustrate the present disclosure and not to limit the technical solutions described in the present disclosure. For example, the directional definitions of "front", "rear", "left", "right", "top", "bottom", etc., although this specification has already described the present disclosure in detail with reference to the above-mentioned embodiments, however, those of ordinary skill in the art should understand that those skilled in the art can still make mutual combinations, modifications, or equivalent substitutions to the present disclosure. And all technical solutions and improvements that do not depart from the spirit and scope of this disclosure should be covered by the scope of the claims of the present disclosure.

What is claimed is:

1. A thermal management system, comprising a refrigerant system and a coolant system, a refrigerant of the refrigerant system and a coolant of the coolant system being isolated from each other without mixing, the refrigerant system comprising a compressor and a first throttling device, the thermal management system further comprising a first dual-channel heat exchanger, the first dual-channel heat exchanger comprising a refrigerant flow channel and a coolant flow channel, the first throttling device being capable of communicating with an inlet of the compressor through the refrigerant flow channel of the first dual-channel heat exchanger;

the coolant system comprising a pump, a first branch and a second branch, the first branch comprising a second heat exchanger, the second branch comprising a third heat exchanger, the coolant system further comprising at least one fourth heat exchanger, at least one of the first branch and the second branch comprising the fourth heat exchanger, the fourth heat exchanger being disposed outside an air-conditioning box of a vehicle;

wherein in a heating mode of the thermal management system, the compressor, the pump is turned on and the first throttling device is opened, and the pump, the coolant flow channel of the first dual-channel heat exchanger, the fourth heat exchanger, and at least one of the second heat exchanger and the third heat exchanger are in series communication in sequence; and wherein in a first cooling mode of the thermal management system, the pump is turned on; the pump, the fourth heat exchanger and the second heat exchanger are in series communication, and the fourth heat exchanger is disposed upstream of the second heat exchanger; and/or, the pump, the fourth heat exchanger and the third heat exchanger are in series communication, and the fourth heat exchanger is disposed upstream of the third heat exchanger.

2. The thermal management system according to claim 1, further comprising a first valve member having three connection ports, a first connection port of the first valve member being capable of communicating with a second connection port of the first valve member or a third connection port of the first valve member; each of the coolant flow channel of the first dual-channel heat exchanger, the first branch and the second branch comprising a first port and a second port; the second connection port of the first valve member being in communication with the first port of the coolant flow channel of the first dual-channel heat exchanger, the first connection port of the first valve member being in communication with the first port of the first branch; the third connection port of the first valve member being in communication with the first port of the second branch, the second port of the first branch and the second port of the second branch being in communication with the second port of the coolant flow channel of the first dual-channel heat exchanger.

3. The thermal management system according to claim 2, further comprising a first shut-off valve, a first port of the first shut-off valve being in communication with one port of the first branch, a second port of the first shut-off valve being in communication with the other port of the first branch; and/or, the thermal management system comprising a second shut-off valve, a first port of the second shut-off valve being in communication with one port of the second branch, a second port of the second shut-off valve being in communication with the other port of the second branch.

4. The thermal management system according to claim 1, wherein the coolant system comprises a first valve member having three connection ports, a first connection port of the first valve member is capable of communicating with a second connection port of the first valve member or a third connection port of the first valve member, each of the coolant flow channel of the first dual-channel heat exchanger, the first branch and the second branch comprising a first port and a second port; the first connection port of the first valve member is in communication with the first port of the first branch; the second connection port of the first valve member is in communication with the first port of the coolant flow channel of the first dual-channel heat exchanger; the third connection port of the first valve member, the second port of the coolant flow channel of the first dual-channel heat exchanger and the second port of the first branch are in communication; and when the first connection port of the first valve member is in communication with the second connection port of the first valve member, the first branch and the first valve member form a first loop; and wherein the coolant system comprises a second valve member having three connection ports, a first mating port of the second valve member is capable of communicating with a second mating port of the second valve member or the third mating port of the second valve member, the first mating port of the second valve member is capable of communicating with the first port of the second branch; the second mating port of the second valve member is in communication with the first port of the coolant flow channel of the first dual-channel heat exchanger; the third mating port of the second valve member and the second port of the coolant flow channel of the first dual-channel heat exchanger are in communication with the second port of the second branch; and when the first mating port of the second valve member is in communication with the second mating port of the second valve member, the second branch and the second valve member form a second loop.

5. The thermal management system according to claim 1, wherein the pump is a first pump, the thermal management system comprises a second pump, the first pump is disposed in the first branch, and the second pump is disposed in the second branch;
wherein the first branch comprises the fourth heat exchanger, the fourth heat exchanger is disposed in series with the second heat exchanger and the first pump.

6. The thermal management system according to claim 1, further comprising a first heat exchanger, the first heat exchanger comprising a refrigerant flow channel and a coolant flow channel, the outlet of the compressor being in communication with an inlet of the refrigerant flow channel of the first heat exchanger; the thermal management system comprising a third loop, the third loop comprising a third pump, the coolant flow channel of the first heat exchanger and a sixth heat exchanger, the third pump, the coolant flow channel of the first heat exchanger and the sixth heat exchanger being in communication in series, the third pump being capable of driving the coolant to flow in the third loop; the sixth heat exchanger being disposed in the air-conditioning box of the vehicle, the first heat exchanger being disposed outside the air-conditioning box of the vehicle;
wherein the third loop is capable of exchanging heat with the second loop or the first loop.

7. The thermal management system according to claim 6, further comprising a first communication pipeline and a second communication pipeline, each of the first communication pipeline and the second communication pipeline comprising a first end and a second end, the first end of the first communication pipeline being in communication with the second loop, the second end of the first communication pipeline being in communication with the third loop, the first end of the second communication pipeline being in communication with the second loop, the second end of the second communication pipeline being in communication with the third loop;
wherein the thermal management system at least comprises a circulation mode, in the circulation mode, part of the coolant in the third loop flows into the second loop through one of the first communication pipeline and the second communication pipeline, the part of the coolant is mixed with the coolant of the second loop, and part of a mixed coolant in the second loop flows into the third loop through the other of the first communication pipeline and the second communication pipeline.

8. The thermal management system according to claim 7, wherein the third loop comprises a third branch, the third branch comprises the third pump, the coolant flow channel of the first heat exchanger and the sixth heat exchanger, and the third pump, the coolant flow channel of the first heat exchanger and the sixth heat exchanger are in communication in series;
wherein the coolant system further comprises a third valve member, the third valve member comprises a first connecting port, a second connecting port and a third connecting port, the third valve member is capable of communicating or blocking a communication path between the first connecting port of the third valve member and the third connecting port of the third valve member or a communication path between the first connecting port and the second connecting port, the first connecting port of the third valve member and the second connecting port of the third valve member are respectively communicated with both ends of the second branch or the third branch, and the third connecting port of the third valve member is in communication with a corresponding branch through the first communication pipeline or the second communication pipeline.

9. The thermal management system according to claim 6, further comprising a third dual-channel heat exchanger, the third dual-channel heat exchanger defining a first flow channel and a second flow channel, the first flow channel of the third dual-channel heat exchanger being a part of the third loop, the second flow channel of the third dual-channel heat exchanger being a part of the second loop;
wherein the coolant system further comprises a bypass pipeline; and
wherein the bypass pipeline is disposed in the third loop, and the third loop is disposed in parallel with the first flow channel of the third dual-channel heat exchanger; or the bypass pipeline is disposed in the second loop, and the bypass pipeline is disposed in parallel with the second flow channel of the third dual-channel heat exchanger.

* * * * *